(12) United States Patent
Zhu et al.

(10) Patent No.: US 9,858,711 B2
(45) Date of Patent: *Jan. 2, 2018

(54) EFFICIENT COMPUTATION OF SHADOWS FOR CIRCULAR LIGHT SOURCES

(71) Applicant: Google Inc., Mountain View, CA (US)

(72) Inventors: Teng-Hui Zhu, San Jose, CA (US); Christopher Craik, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/465,569

(22) Filed: Mar. 21, 2017

(65) Prior Publication Data

US 2017/0193689 A1    Jul. 6, 2017

Related U.S. Application Data

(63) Continuation of application No. 14/530,282, filed on Oct. 31, 2014, now Pat. No. 9,639,976.

(51) Int. Cl.
*G06T 15/60* (2006.01)
*G06T 15/06* (2011.01)
(Continued)

(52) U.S. Cl.
CPC .............. *G06T 15/60* (2013.01); *G06T 15/06* (2013.01); *G06T 15/08* (2013.01); *G06T 15/506* (2013.01);
(Continued)

(58) Field of Classification Search
None
See application file for complete search history.

(56) References Cited

U.S. PATENT DOCUMENTS 5,495,536 A    2/1996  Osbourn
5,808,620 A *  9/1998  Doi ......................... G06T 15/60
                                                        345/426
(Continued)

FOREIGN PATENT DOCUMENTS

EP         0 702 333 A2      9/1996

OTHER PUBLICATIONS

R. Fernando, "Percentage-Closer Soft Shadows", 32nd International Conference on Computer Graphics and Interactive Techniques (SIGGRAPH 2005), Jul. 31, 2005, Sketches Article No. 35, Association for Computing Machinery, Los Angeles, CA.
J.M. Hasenfratz et al., "A Survey of Real-time Soft Shadows Algorithms", Computer Graphics Forum, Dec. 2003, vol. 22, No. 4, p. 753-774, Blackwell Publishers, Oxford UK.
(Continued)

*Primary Examiner* — Said Broome
(74) *Attorney, Agent, or Firm* — McDonnell Boehnen Hulbert & Berghoff LLP

(57) ABSTRACT

Methods and apparatus are provided for displaying shadows of circular light sources. A computing device can determine a light source and an occluding polygon that is between the light source and a receiver surface, where the occluding polygon includes vertices connected by edges. The computing device can determine a shadow of the occluding polygon on the receiver surface by at least: determining, for a particular vertex, a projection vertex on the receiver surface by projecting a ray from the center point through the particular vertex; determining an outline polygon based on the projection vertex; determining a projection circle around the projection vertex; determining a penumbra of the shadow based on exterior tangents outside of the outline polygon; and determining an umbra of the shadow based on interior tangents inside the outline polygon. The computing device can display at least part of the shadow.

20 Claims, 19 Drawing Sheets

(51) Int. Cl.
*G06T 15/08* (2011.01)
*G06T 17/20* (2006.01)
*G06T 15/50* (2011.01)

(52) U.S. Cl.
CPC .......... *G06T 17/20* (2013.01); *G06T 2200/04* (2013.01); *G06T 2200/24* (2013.01)

(56) References Cited

U.S. PATENT DOCUMENTS

| | | | |
|---|---|---|---|
| 7,242,408 B1* | 7/2007 | Dunn | G06T 15/04 345/426 |
| 7,508,390 B1* | 3/2009 | Demers | G06T 15/04 345/422 |
| 7,817,823 B1* | 10/2010 | O'Donnell | G06T 15/60 345/426 |
| 8,379,021 B1 | 2/2013 | Miller et al. | |
| 8,638,989 B2 | 1/2014 | Holz | |
| 9,262,861 B2 | 2/2016 | Zhu et al. | |
| 2003/0174049 A1 | 9/2003 | Beigel et al. | |
| 2012/0256915 A1* | 10/2012 | Jenkins | G06T 15/40 345/419 |
| 2014/0085101 A1 | 3/2014 | Rahman et al. | |
| 2014/0111534 A1 | 4/2014 | Niles et al. | |
| 2014/0240477 A1 | 8/2014 | Feng et al. | |
| 2016/0125642 A1 | 5/2016 | Zhu et al. | |

OTHER PUBLICATIONS

Zhu et al., "Efficient Computation of Shadows", U.S. Appl. No. 14/337,115, filed Jul. 21, 2014.

\* cited by examiner

FIG. 8A   FIG. 8B

EFFICIENT COMPUTATION OF SHADOWS FOR CIRCULAR LIGHT SOURCES

CROSS-REFERENCE TO RELATED APPLICATIONS

This application is a continuation of U.S. patent application Ser. No. 14/530,282, entitled "Efficient Computation of Shadows for Circular Light Sources", filed Oct. 31, 2014, which is fully incorporated herein for all purposes.

BACKGROUND

Unless otherwise indicated herein, the materials described in this section are not prior art to the claims in this application and are not admitted to be prior art by inclusion in this section.

Many modern computing devices, including mobile phones, personal computers, and tablets, provide graphical user interfaces (GUIs) for permitting users to interact with the computing device. For example, application programs can use the GUI to communicate with a user using images, text, and graphical elements such as windows, dialogs, pop-ups, images, buttons, scrollbars, and icons. The GUI can also receive inputs from user-interface devices such as touch screens, computer mice, keyboards, and other user-interface devices to permit the user to control the GUI, and thus the application program.

In some cases, the GUI can be used to interact with an operating system (OS) to manage the computing device. For example, the OS can have a control panel or setting application that uses the GUI to draw one or more windows related to control settings for some aspect(s) of the computing device, such as audio controls, video outputs, computer memory, and human language(s) used by the OS (e.g., choose to receive information in English, French, Mandarin, Hindi, Russian, etc.). The control panel/settings application can receive subsequent input related to the window(s) using the GUI. The GUI can provide the inputs to the OS, via the control panel/settings application, to manage the computing device.

SUMMARY

In one aspect, a method is provided. A computing device determines a light source. The light source is configured to emit light and the light source includes a center point. The computing device determines an occluding polygon that is between the light source and a receiver surface. The occluding polygon includes a plurality of occluding-polygon vertices connected by occluding-polygon edges. The computing device determines a shadow of the occluding polygon on the receiver surface by at least: for a particular occluding-polygon vertex in the plurality of occluding-polygon vertices, determining a projection vertex on the receiver surface based on a ray projected from the center point through the particular occluding-polygon vertex; determining an outline polygon based on the projection vertex; determining a projection circle around the projection vertex; determining a penumbra of the shadow of the occluding polygon based on one or more exterior tangents to the projection circle that are outside of the outline polygon; and determining an umbra of the shadow of the occluding polygon based on one or more interior tangents to the projection circle that are inside of the outline polygon. The computing device provides at least part of the shadow of the occluding polygon for display.

In another aspect, a computing device is provided. The computing device includes one or more processors and data storage. The data storage is configured to store at least executable instructions. The executable instructions, when executed by the one or more processors, cause the computing device to perform functions. The functions include: determining a light source configured to emit light, where the light source includes a center point; determining an occluding polygon between the light source and a receiver surface, where the occluding polygon includes a plurality of occluding-polygon vertices connected by occluding-polygon edges; determining a shadow of the occluding polygon on the receiver surface by at least: for a particular occluding-polygon vertex in the plurality of occluding-polygon vertices, determining a projection vertex on the receiver surface based on a ray projected from the center point through the particular occluding-polygon vertex, determining an outline polygon based on the projection vertex, determining a projection circle around the projection vertex, determining a penumbra of the shadow of the occluding polygon based on one or more exterior tangents to the projection circle that are outside of the outline polygon, and determining an umbra of the shadow of the occluding polygon based on one or more interior tangents to the projection circle that are inside of the outline polygon; and providing at least part of the shadow of the occluding polygon for display.

In another aspect, an article of manufacture is provided. The article of manufacture includes a tangible computer readable medium configured to store at least executable instructions. The executable instructions, when executed by one or more processors of a computing device, cause the computing device to perform functions. The functions include: determining a light source configured to emit light, where the light source includes a center point; determining an occluding polygon between the light source and a receiver surface, where the occluding polygon includes a plurality of occluding-polygon vertices connected by occluding-polygon edges; determining a shadow of the occluding polygon on the receiver surface by at least: for each occluding-polygon vertex in the plurality of occluding-polygon vertices, determining a projection vertex on the receiver surface based on a ray projected from the center point through the occluding-polygon vertex, determining an outline polygon based on the projection vertex, determining a projection circle around the projection vertex, determining a penumbra of the shadow of the occluding polygon based on one or more exterior tangents to the projection circle that are outside of the outline polygon, and determining an umbra of the shadow of the occluding polygon based on one or more interior tangents to the projection circle that are inside of the outline polygon; and providing at least part of the shadow of the occluding polygon for display.

In another aspect, a device is provided. The device includes: means for determining a light source configured to emit light, where the light source includes a center point; means for determining an occluding polygon between the light source and a receiver surface, where the occluding polygon includes a plurality of occluding-polygon vertices connected by occluding-polygon edges; means for determining a shadow of the occluding polygon on the receiver surface that include: means for, determining, for each occluding-polygon vertex in the plurality of occluding-polygon vertices, a projection vertex on the receiver surface based on a ray projected from the center point through the occluding-polygon vertex, means for determining an outline polygon based on the projection vertex, means for determining a projection circle around the projection vertex, means for determining a penumbra of the shadow of the occluding polygon based on one or more exterior tangents to the projection circle that are outside of the outline polygon, and means for determining an umbra of the shadow of the occluding polygon based on one or more interior tangents to the projection circle that are inside of the outline polygon; and means for providing at least part of the shadow of the occluding polygon for display.

BRIEF DESCRIPTION OF THE DRAWINGS

FIG. 8A shows an occluding polygon, in accordance with an example embodiment.

FIG. 8B shows a tessellation of an ambient shadow polygon for the occluding polygon of FIG. 8A, in accordance with an example embodiment.

DETAILED DESCRIPTION

Figure 1:
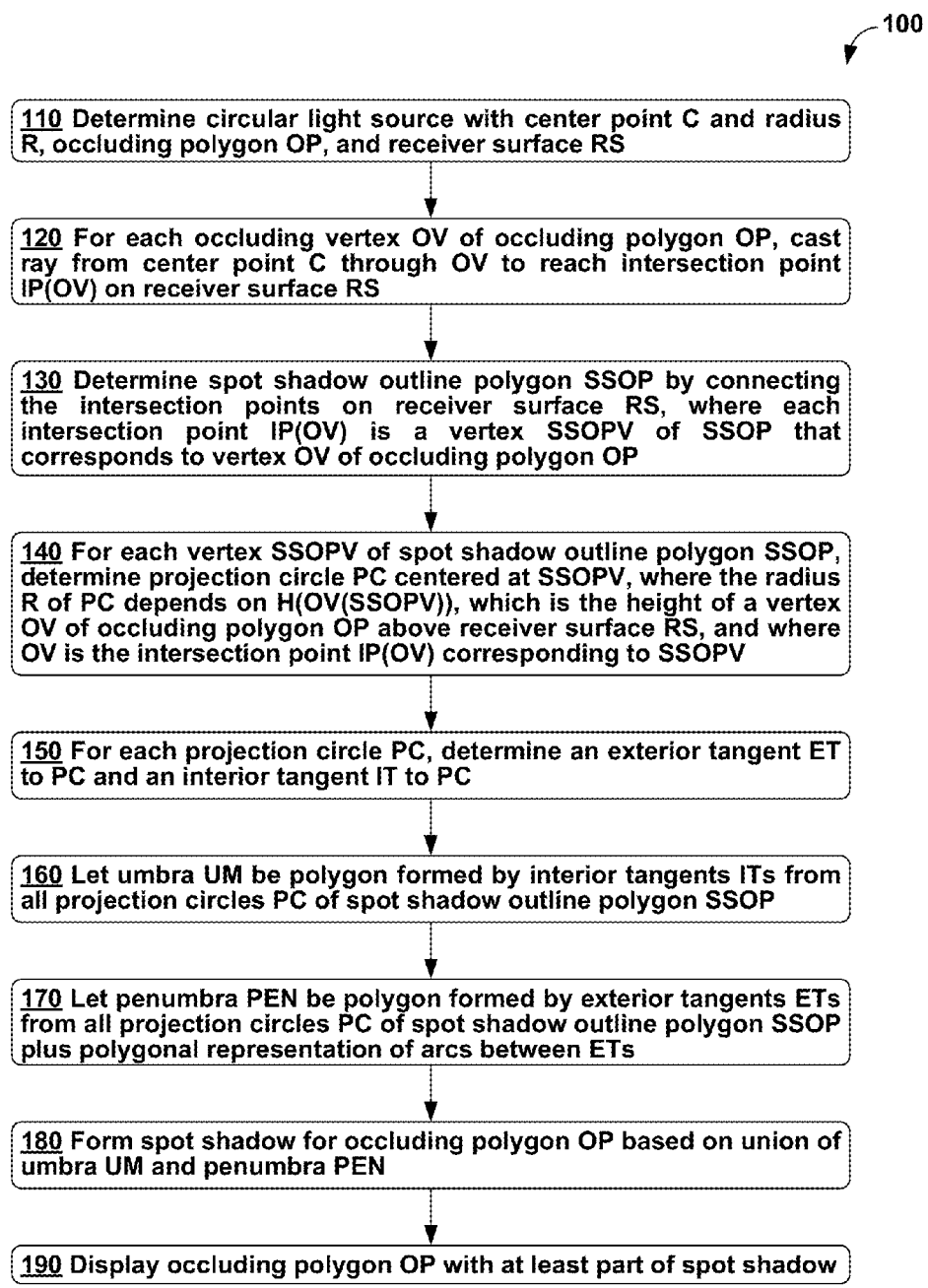
FIG. 1 is a flow chart illustrating a method for generating a display including a shadow, in accordance with an example embodiment.

Modern graphical user interfaces can use depth to convey importance and structure. One intuitive technique to convey depth is to use shadows. Current approaches to shadows have been limited to replicate very simple lighting models. These simple lighting models often lack realism. Other approaches, such as shadow mapping and shadow volumes, can be too computationally expensive for mobile devices, such as smart phones. Further, these other approaches are typically targeted to shadow objects with complex geometries. In contrast, a graphical user interface for a mobile device often renders objects with simple geometries, such as circles, triangles, and rectangles and related objects, such as rounded rectangles and ellipses.

Shadows can be cast by light emitted to one or more direct light sources, such as circular or point light sources, and then blocked by one or more occluding objects. Such shadows cast by direct light sources are termed herein as "spot shadows". Other shadows can be cast by blockage of ambient light in an environment by one or more occluding objects. The shadows cast by ambient light are termed herein "ambient shadows". In some cases, ambient light can be modeled as being emitted by an ambient light source.

A direct approach to providing spot shadows for polygons can begin with a fairly simple lighting configuration; e.g., simulating a planar polygon being illuminated by a circular light source using a computing device. The circular light source can be represented as a center point and perhaps a non-zero radius. Based on the geometry and physical computation, the spot shadow of light emitted by the circular light source that is cast by the planar polygon upon a receiver surface (background surface) can be generated.

In a relatively simple example, the simulation can involve a light source, a polygon and one surface in 3-dimensional space (3-D)—a circular light source, an occluding polygon, and a background or receiver surface. The occluding polygon can block light emitted from the circular light source that otherwise would reach the receiver surface and so cast a shadow on the receiver surface. In a real world example that could be modeled by the simulation, light emitted through a circular lamp shade (a circular light source) toward a wall (a receiver surface) can be partially blocked by a birthday card (an occluding polygon) held between the lamp shade and the wall. Then, the birthday card would cast a shadow of light emitted from the lamp shade on the wall; e.g., the shadow of light is a spot shadow of the birthday card.

The simulation can involve the following procedures:

1. Casting rays from the center of the circular light source to vertices of occluding polygon to produce an "outline" polygon where the rays reach the receiver surface.

2. For each vertex of the outline polygon, compute a projection circle, where a radius of the projection circle is proportional to the height above the receiver surface of the vertex of the occluding polygon that corresponds to the vertex of the outline polygon, and where a center of the projection circle is the vertex of the outline polygon.

3. For each projection circle, determine an exterior tangent, where the exterior tangent to the projection circle can be a tangent to the projection circle that intersects the projection circle at a point that is outside of spot shadow outline polygon SSOP, and let the point that intersects the projection circle outside of spot shadow outline polygon SSOP be called a penumbra vertex. The penumbra vertex can be a point where a ray of starting at the center of the projection circle and directed away from spot shadow outline polygon SSOP intersects the projection circle. As an example, a normal to an edge of the outline polygon can be determined, and a ray RN1 starting at the center of the projection circle can be drawn in the direction of the normal and directed away from spot shadow polygon SSOP. Then, a penumbra vertex can be located at the point where ray RN1 intersects the projection circle, and an exterior tangent can be drawn at the penumbra vertex. A penumbra area can be formed using the exterior tangents and arcs of projection circles between exterior tangents. In other embodiments, a convex hull of the penumbra vertices can be used to form the penumbra area.

4. For each projection circle, determine an interior tangent, where the interior tangent to the projection circle can be a tangent to the projection circle that intersects the projection circle at a point that is inside of spot shadow outline polygon SSO, and let the point that intersects the projection circle inside of spot shadow outline polygon SSOP be called an umbra vertex. The umbra vertex can be a point where a ray starting at the center of the projection circle and directed toward spot shadow outline polygon SSOP intersects the projection circle. As an example, a centroid (or center) of spot shadow outline polygon SSOP can be determined and a ray RN2 can be drawn starting at the center of the projection circle and directed toward the centroid of spot shadow polygon SSOP. Then, an umbra vertex can be located at the point where ray RN2 intersects the projection circle. An umbra area can then be formed by determining the convex hull of the umbra vertices (e.g., connect the umbra vertices to form the umbra area).

5. In some cases, a tessellation of the umbra area and a spot shadow region between the edge of the umbra area and the edge of the penumbra area can be generated. Several techniques for determining the tessellation are possible. One technique can involve generating rays from the centroid of the umbra area to both umbra and penumbra vertices. Additional umbra vertices can be generated where the rays intersect the edge of the umbra area, and additional penumbra vertices can be generated where the rays intersect the edge of the penumbra area. To generate the tessellation, the penumbra and umbra vertices for each ray can be connected.

Another tessellation technique can include taking each penumbra vertex, finding the closest umbra vertex, and connecting the two vertices with a connecting line. Then, as both the penumbra area and the umbra area are convex polygons, the set of connecting lines and the borders of the umbra and penumbra areas lead to a tessellation of a spot shadow region using triangles and/or convex quadrangles. A convex quadrangle can be tessellated into two triangles by connecting a pair of non-adjacent vertices with a connecting line, and so this technique can be utilized to tessellate the spot shadow region with triangles.

In particular embodiments, transparency values of the vertices of the tessellation inside or on the edge of the umbra area can be set to opaque (not transparent) and transparency values of vertices of the tessellation on the edge of the penumbra area can be set to transparent. In other cases, other renderable representations for the spot shadow region rather than a tessellation can be generated. This tessellation technique does not include generating additional rays or ray intersections, and therefore does not lead to adding additional umbra or penumbra vertices.

6. In some cases, either before or after the tessellation performed in the prior step, the occluding polygon can be projected onto the receiver surface to form an occluding polygon space. Then, to avoid overdraw, any portion of the union of the umbra area and the shadow region that intersects with the occluding polygon space can be deleted from the tessellation.

7. At least a portion of the occluding polygon and/or the tessellation of the umbra area and the shadow region can be rendered for display. If Steps 5 and 6 use triangles in tessellating the umbra area and shadow region, a graphics processor, such as a graphics processing unit (GPU), may be able to easily render the triangles in the tessellation. GPU rendering of shadows can help performance of the computing device, especially mobile devices, since GPUs on mobile devices may have relatively-low pixel filling rates compared to other devices.

A similar approach can be used to simulate shadows cast by ambient light; that is, light from one or more indirect light sources. For example, in a room with several lamps, a portion of the room can be lit from light emitted by one or more of the lamps that has hit one or more objects in the room (e.g., walls, ceiling, floor, furniture, lamp bodies), bounced off these objects one or more times, and reached the portion of the room. In this example, ambient light can be the light that has reached the portion of the room indirectly. In some scenarios, ambient light can be represented as light generated by a very large or infinitely-sized planar or dome-shaped light source which can emit light in all directions equally.

Simulation of a shadow of an occluding polygon cast by ambient light onto a receiver surface can involve the following procedures:

1. Determine an ambient outline polygon by projecting the occluding polygon to the receiver surface using a projection matrix for the display.

2. For each vertex of the ambient outline polygon, determine an expansion circle. A radius of the expansion circle can be proportional to the height above the receiver surface of the vertex of the occluding polygon that corresponds to the vertex of the ambient outline polygon, and where a center of the expansion circle is the vertex of the ambient outline polygon.

3. An ambient shadow polygon can be determined based on the expansion circles for the vertices of the ambient outline polygon. For each projection circle, determine normals to the edges of the outline polygon associated with the vertex of the ambient shadow polygon at the center of the expansion circle. For each normal, draw a ray from the center of the expansion circle away from the ambient outline polygon in the direction of the normal, and take an exterior tangent to the expansion circle at an "ambient vertex", which can be a point where the ray intersects the expansion circle. The convex hull of the ambient vertices, or some other representation of the exterior tangents of the expansion circles, can be used as the ambient shadow polygon.

4. To smooth the corners of the ambient shadow polygon, the two normals associated with a corner of the ambient shadow polygon can be interpolated, one or more rays emitted from the center of the expansion circle emitted in the direction(s) of the interpolated normal(s) away from the ambient outline polygon, and additional ambient vertices determined where the ray(s) along the interpolated normal(s) intersect the expansion circle. Then, the ambient shadow polygon can be recalculated based on the additional ambient vertices; e.g., the convex hull can be regenerated using the additional ambient vertices as well.

5. A tessellation of the ambient outline polygon and an ambient shadow region between the edge of the ambient outline polygon and the edge of the ambient shadow polygon can be generated. In particular embodiments, transparency values of the vertices of the tessellation inside or on the edge of the ambient outline polygon can be set to opaque (not transparent), a value based on a height of a corresponding vertex, or some other value(s). In still other embodiments, transparency values of vertices of the tessellation on the edge of the ambient shadow polygon can be set to transparent. In other cases, other renderable representations for the shadow region rather than a tessellation can be generated.

6. At least a portion of the occluding polygon and/or the tessellation of the ambient outline polygon and the ambient shadow region can be rendered for display.

These approaches to shadow simulation can provide realistic looking shadows for both circular light sources and ambient light sources while using limited processing power. In the context of GUIs, the resulting shadowed objects can have shadows that look more correct compared to other approaches without incurring a performance penalty so great to make the GUI unusable. Further, GUI objects with shadows can be readily identified as being on top of (or below) other GUI elements, as users are intuitively aware of visual cues provided by shadows. Also, shadows are relatively unobtrusive, providing depth information without requiring too much user attention to observe the GUI. Other software than GUIs, such as games and other software applications, also can use the herein-described techniques to provide realistic looking shadows at a reasonable computational cost.

Generating Displays of Shadows of Circular Light Sources and Ambient Light

FIG. 1 is a flow chart illustrating method 100 for generating a display including a shadow, in accordance with an example embodiment. Method 100 and the functionality of scenario 200 can be carried out by hardware of a computing device and/or computer-readable instructions executed by one or more processors of the computing device, such as computing device 1200 discussed below in the context of FIG. 12A.

Method 100 can begin at block 110, where the computing device can determine a simulated light source with a center point, such as a circular light source having at least a center point C and radius R, a simulated occluding polygon OP, and a simulated receiver surface RS. In some embodiments, the computing device can verify that occluding polygon OP is between the circular light source and receiver surface RS. As occluding polygon OP is a polygon, occluding polygon OP is a planar shape that has at least three sides that are connected at an equal number of vertices. In other embodiments, if radius R (is less than or) equals 0, then the circular light source can be a point light source emitted light from center point 0.

At block 120, for each occluding vertex OV of occluding polygon OP, the computing device can simulate casting a ray from center point C through OV to reach an intersection point, denoted as IP(OV), on the receiver surface. As vertex OP is a vertex of occluding polygon OP, Vertex OV can be termed as an occluding vertex.

At block 130, the computing device can determine spot shadow outline polygon SSOP by connecting the intersection points with line segments that lie in the plane of receiver surface RS. As intersection points are based on rays through vertices of occluding polygon OP, each intersection point IP(OV) of the intersection points can be a vertex SSOPV of spot shadow outline polygon SSOP, where SSOPV can be associated with a vertex OV of occluding polygon OP. A particular occluding vertex OVp of an occluding polygon OP can be associated with a particular intersection point IPp or spot shadow outline polygon vertex SSOPVp when intersection point IPp or vertex SSOPVp is a projection of occluding vertex OVp onto receiver surface 724 made by a simulated ray cast through occluding vertex OVp in block 120.

Figure 2A:
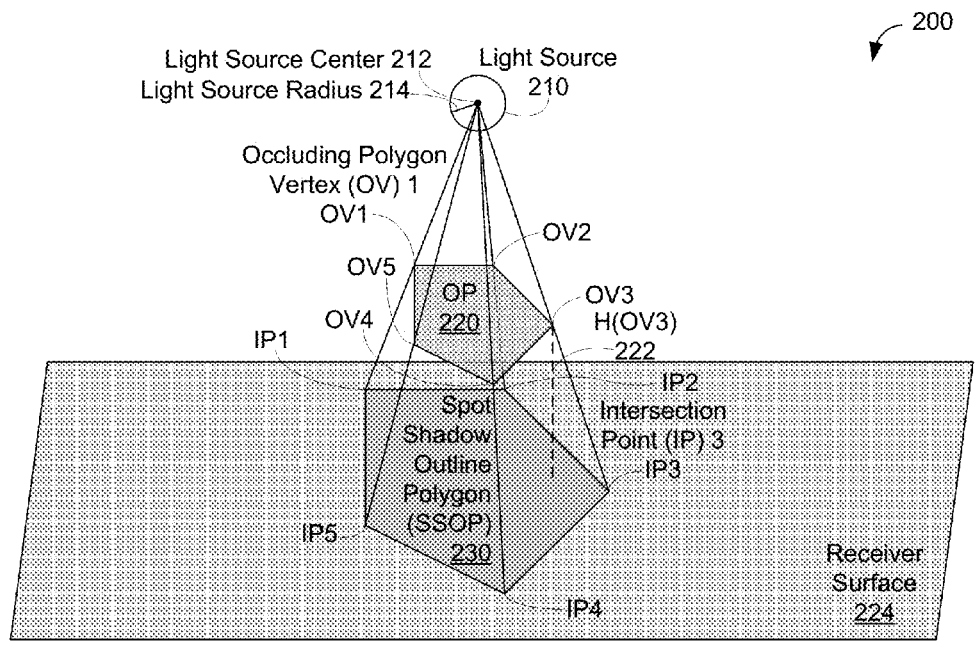
FIG. 2A shows a scenario with a circular light source emitting light onto an occluding polygon and a corresponding spot shadow outline polygon on a receiver surface, in accordance with an example embodiment.

For example, FIGS. 2A-2E show a scenario 200 for simulating shadows. In FIG. 2A, circular light source 210 is shown with light source center 212 and light source radius 214 emitting light toward receiver surface 224. Some of the light emitted by circular light source 210 is intercepted, or occluded, by occluding polygon (OP) 220. Occluding polygon OP 220 has five vertices: OV1, OV2, OV3, OV4, and OV5. Each vertex OV1-OV5 of occluding polygon OP 220 can have a height measured with respect to receiver surface 224—FIG. 2A shows a height H(OV3) 222 determined for vertex OV3 indicating a distance that vertex OV3 is above receiver surface 222. In scenario 200, occluding polygon OP 220 is parallel to receiver surface 224, and so each of vertices OV1-OV5 has the same height; e.g., H(OV1), the height of vertex OV1, =H(OV3), H(OV2)=H(OV3), H(OV4)=H(OV3), and H(OV5)=H(OV3).

Spot shadow outline polygon (SSOP) 230 is determined during scenario 200 by simulated emission of rays of light from light source center 212 of light source 210 that pass through each of the vertices of occluding polygon OP 220 and reach receiver surface 224. For example, FIG. 2A shows a ray of light emitted from light source center 212 passing through vertex OV1 of occluding polygon OP 220 to reach receiver surface 224 at intersection point (IP) 1. Similarly, FIG. 2A shows separate rays of light emitted from light source center 212 passing through each of vertex OV2, OV3, OV4, and OV5 of occluding polygon OP 220 to reach receiver surface 224 at respective intersection points IP2, IP3, IP4, and IP5. Then, each vertex OV1, OV2, OV3, OV4, and OV5 can be associated with respective intersection points IP1, IP2, IP3, IP4, and IP5, where the intersection points are also vertices of spot shadow outline polygon 230. Spot shadow outline polygon SSOP 230 can then be formed by connecting the intersection points IP1-IP5 with line segments in the plane of receiver surface 224.

At block 140 of method 100, for each vertex SSOPV of spot shadow outline polygon SSOP, the computing device can determine projection circle PC centered at SSOPV. The radius R of projection circle PC can depend on H(OV (SSOPV)), height above receiver surface RS of an occluding vertex OV that is associated with a spot shadow outline polygon vertex SSOPV.

Figure 2B:
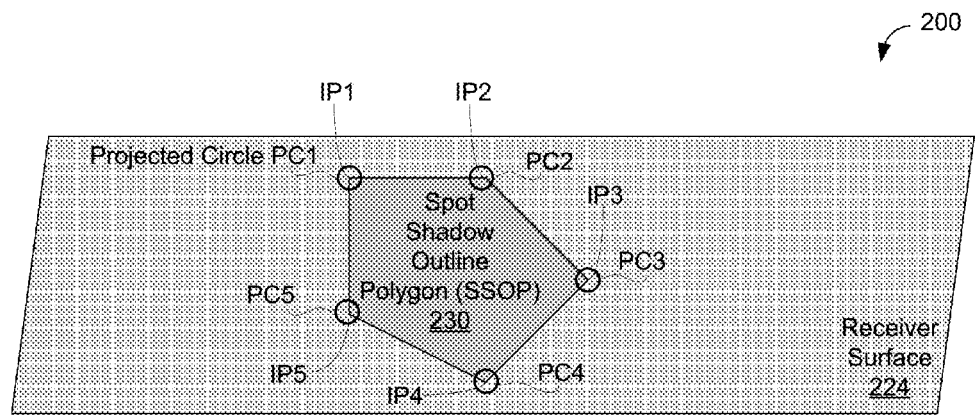
FIG. 2B shows the spot shadow outline polygon of FIG. 2A with projection circles, in accordance with an example embodiment.

As an example, FIG. 2B shows receiver surface 224 for scenario 200 with spot shadow outline polygon SSOP 230 indicated with five vertices IP1, IP2, IP3, IP4, and IP5, where each vertex is an intersection point determined at block 120. Each vertex IP1, IP2, IP3, IP4, and IP5 is shown in FIG. 2B is at the center of a respective projection circle PC1, PC2, PC3, PC4, and PC5. Each of projection circles PC1, PC2, PC3, PC4, and PC5 is the same size in scenario 200, as the size of each of the radii for projection circles PC1, PC2, PC3, PC4, and PC5 is the same. For example, the occluding polygon vertex corresponding to intersection point IP1 is vertex OV1, and the occluding polygon vertex corresponding to intersection point IP2 is vertex OV2; that is OV(IP1)=OV1 and OV(IP2)=OV2. Also, in scenario 200, the heights of vertex OV1 and OV2 are equal; that is H(OV1)=H(OV2). In scenario 200, the radius R of each projection circle PC is proportional to H(OV(SSOPV)); that is R=p1*H(OV(SSOPV)), where p1>0 is a constant of proportionality used throughout scenario 200.

Then the radius for projection circle PC1, R(PC1)=p1*H(OV(IP1)) and the radius for projection circle PC2, R(PC2)= p1*H(OV(IP2)). As OV(IP1)=OV1, and OV(IP2)=OV2, then R(PC1)=p1*H(OV1) and R(PC2)=p1*H(OV2). Then, as H(OV1)=H(OV2), R(PC1)=R(PC2). Similar calculations indicates that radii for projection circles PC1-PC5 are equal; e.g., R(PC1)=R(PC2)=R(PC3)=R(PC4)=R(PC5).

At block 150 of method 100, for each projection circle PC, the computing device can determine an exterior tangent ET to PC and an interior tangent IT to PC.

As one technique for determining exterior tangents, the computing device can determine, for each projection circle PC, normals N1 and N2 to respective edges E1 and E2 of spot shadow outline polygon SSOP associated with the vertex SSOPV at the center of projection circle PC. Then, for each normal N1 and N2, draw a ray from the center of the projection circle away from the spot shadow outline polygon SSOP in the direction of the normal. The computing device can determine a penumbra vertex PV is at a point where the ray away from the spot shadow outline polygon SSOP in the direction of the normal intersects the projection circle that is outside, or exterior to, spot shadow outline polygon SSOP. The exterior tangent then can be drawn at penumbra vertex PV.

As another technique for determining exterior tangents, a bisector angle for an exterior angle of spot shadow outline polygon SSOP can be determined. Then, a ray can be sent from a center of a projection circle; i.e., a vertex of spot shadow outline polygon SSOP in the direction of the bisector angle for the exterior angle until the ray reaches the projection circle, where a penumbra vertex can be specified as the point where the ray reaches the projection circle. Then, an exterior tangent to the projection circle can be drawn at the penumbra vertex. Other techniques for determining exterior tangents and penumbra vertices are possible as well.

Figure 2C:
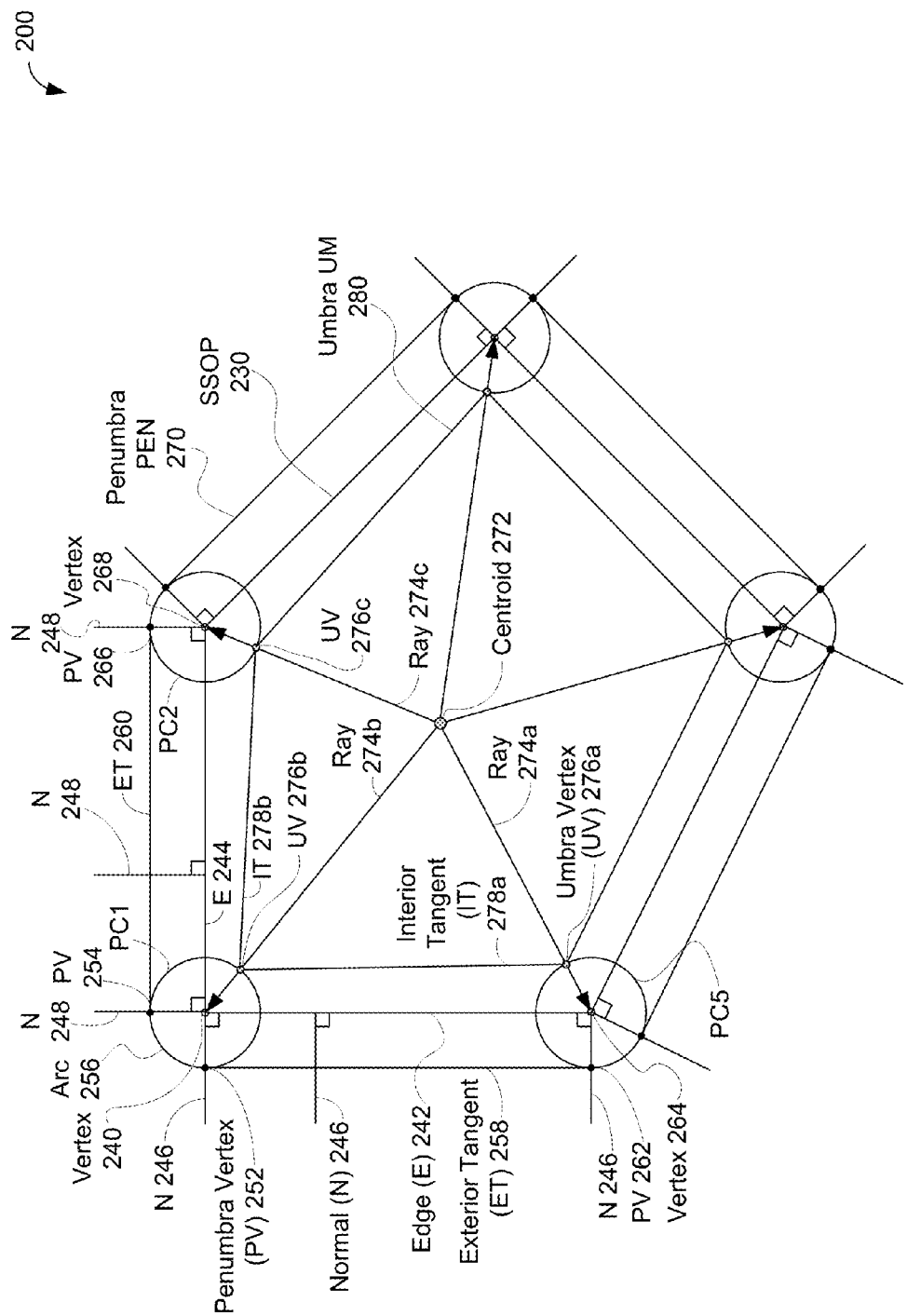
FIG. 2C shows the spot shadow outline polygon of FIG. 2A with an umbra and a penumbra, in accordance with an example embodiment.

For example, FIG. 2C shows spot shadow outline polygon SSOP 230 of scenario 200 with projection circle PC1 having vertex 240, which is also a vertex of spot shadow outline polygon SSOP 230. Vertex 240 is an endpoint of edges (E) 242 and 244 of spot shadow outline polygon SSOP 230. FIG. 2C shows edge 242 having normal 246 that is drawn at multiple places along edge 242, and shows edge 244 having normal 248 that is drawn at multiple places along edge 242. In scenario 200, a ray drawn in the direction of normal 246 from vertex 240 (at the center of projection circle PC1) away from spot shadow outline polygon SSOP 230 reaches projection circle PC1 at penumbra vertex (PV) 252. In scenario 200, a ray drawn in the direction of normal 248 from vertex 240 away from spot shadow outline polygon SSOP 230 reaches projection circle PC1 at penumbra vertex 254.

An arc along projection circle can be drawn between a penumbra vertex PV(N1) where the ray in the direction of normal N1 reaches the projection circle and penumbra vertex PV(N2) where the ray in the direction of normal N2 reaches the projection circle, and where the arc does not intersect spot shadow outline polygon SSOP. Two exterior tangents can have an endpoint based on projection circle PC—one exterior tangent ET1 can end at penumbra vertex PV(N1) and another exterior tangent ET2 can end at penumbra vertex PV(N2). ET1 (ET2) can travel in the general direction of edge E1 (E2) until reaching a penumbra vertex for a projection circle for the other endpoint of edge E1 (E2). Then, the exterior tangent can be drawn from PV(N1) (PV(N2)) in the direction of edge E1 (E2) until reaching IP2.

For example, FIG. 2C shows exterior tangent (ET) 258 drawn between penumbra vertex 252 and penumbra vertex 262, with penumbra vertex 262 located where a ray in the direction of normal 246 intersects with projection circle PC5 outside of spot shadow outline polygon SSOP 230, and shows exterior tangent 260 drawn between penumbra vertex 254 and penumbra vertex 266, which is located where a ray in the direction of normal 248 intersects with projection circle PC2 outside of spot shadow outline polygon SSOP 230. Exterior tangents 258 and 260 can be connected using arc 256 of projection circle PC1 between penumbra vertices 252 and 254.

As one technique for determining interior tangents, the computing device can determine, for each projection circle PC, a ray starting at the center of projection circle PC (which is a vertex of spot shadow outline polygon SSOP) through a centroid of spot shadow outline polygon SSOP. Then, let umbra vertex UV be a point on projection circle PC where the ray through the centroid intersects projection circle PC. In this case, umbra vertex UV is within spot shadow outline polygon SSOP.

As another technique for determining interior tangents, a bisector angle for an interior angle of spot shadow outline polygon SSOP can be determined. Then, a ray can be sent from a center of a projection circle; i.e., a vertex of spot shadow outline polygon SSOP in the direction of the bisector angle for the interior angle until the ray reaches the projection circle, where an umbra vertex can be specified as the point where the ray reaches the projection circle. Then, an interior tangent to the projection circle can be drawn at the umbra vertex. Other techniques for determining internal tangents and umbra vertices are possible as well.

Two interior tangents can have an endpoint based on umbra vertex UV of projection circle PC. The center of projection circle PC can be an endpoint for two edges, E1 and E2, of the spot shadow outline polygon SSOP. One interior tangent IT1 can start at umbra vertex UV, go in the direction of edge E1, and end an umbra vertex UV1 generated as discussed above for umbra vertex UV for a projection circle PC1 around vertex V1 at the other endpoint of edge E1. A second interior tangent IT2 can start at umbra vertex UV, go in the direction of edge E2, and end an umbra vertex UV2 generated as discussed above for umbra vertex UV, for a projection circle PC2 around vertex V2 at the other endpoint of edge E2.

For example, FIG. 2C shows that, as part of scenario 200, spot shadow outline polygon SSOP 230 has centroid 272. One technique to determine centroid 272 is to determine intersection of a ray from the light source center 212 passing through a centroid of occluding polygon OP 220 with receiver surface 224. During scenario 200, rays are generated from centroid 272 to the vertices of spot shadow outline polygon SSOP 230, such as ray 274a going from centroid 272 and passing through umbra vertex (UV) 276a before reaching vertex 264 at the center of projection circle PC5, ray 274b from centroid 272 and passing through umbra vertex 276b before reaching vertex 240 at the center of projection circle PC1, and ray 274c from centroid 272 passing through umbra vertex 276c before reaching vertex 268 at the center of projection circle PC2. Then, FIG. 2C shows two interior tangents have an endpoint at umbra vertex 276b on projection circle PC1: interior tangent (IT) 278a between umbra vertex 276a on projection circle PC5 and umbra vertex 276b, and interior tangent 278b between umbra vertex 276b and umbra vertex 276c on projection circle PC2.

At block 160 of method 100, the computing device can form umbra UM as a polygon including interior tangents ITs from all projection circles PC of spot shadow outline polygon SSOP. The union of the interior tangents and umbra vertices for all projection circles PC generated at block 150 forms a polygon that can be labeled as umbra UM. An example umbra UM 280 is shown in FIG. 2C as a polygon formed by the union of interior tangents, including interior tangents 278a and 278b, and umbra vertices, including umbra vertices 276a, 276b, and 276c.

At block 170 of method 100, the computing device can form penumbra PEN as a polygon (or other penumbra area) formed by exterior tangents ETs from all projection circles PC of spot shadow outline polygon SSOP plus polygonal, or other, representation of arcs between exterior tangents ETs. In scenario 200, the union of exterior tangents, including exterior tangents 258 and 260, and connecting arcs, including arc 256, for spot shadow outline polygon SSOP 230 can form penumbra PEN 270 shown in FIG. 2C.

An example polygonal representation of an arc between two endpoints EP1 and EP2 is a line segment between EP1 and EP2. In some embodiments, a convex hull of the penumbra vertices can be used to form penumbra PEN. The convex hull can include a line segment for each pair of penumbra vertices associated with a common projection circle, where the line segment is a polygonal representation replacing an arc on the common projection circle.

In other embodiments, the arcs between intersection points at the same projection circle can be replaced a polygonal representation using two or more line segments. To smooth the corners of penumbra PEN, the two normals associated with a corner of penumbra PEN can be interpolated, with one or more rays emitted from the center of the projection circle emitted in the direction(s) of the interpolated normal(s) away from spot shadow outline polygon SSOP, and additional penumbra vertices determined where the ray(s) along the interpolated normal(s) intersect the expansion circle. Then, a polygon for penumbra PEN can be recalculated based on the additional penumbra vertices; e.g., the convex hull can be regenerated using the additional penumbra vertices.

For example, the angle between normals associated with a projection circle PC can be interpolated to obtain one or more interpolated angles IA1, IA2 . . . . For each interpolated angle IA, a ray can be cast from the center of projection circle PC in a direction along interpolated angle IA that is headed away from spot shadow outline polygon SSOP to intersect projection circle PC at an interpolated intersection point IIP. Then, to represent the arc between two penumbra vertices PV(N1) and PV(N2) using n interpolated intersection points IIP1, IIP2, . . . IIPn, n>0, that interpolate angles from N1 to N2, line segments can be drawn between: (1) PV(N1) and a first interpolated intersection point IIP1, (2) IIP1 and a second interpolated intersection point IIP2, (n+1) between interpolated intersection point IIPn and PV(N2) is drawn. In this example, if interpolated intersection point(s) are used, the interpolated intersection point(s) can treated as penumbra vertices, Then, penumbra PEN can be a convex hull around intersection points/penumbra vertices including the interpolated intersection point(s), and so can include one or more line segments between one or more interpolated intersection points. Other techniques for representing arcs between intersection points are possible as well.

In still other embodiments, an exterior tangent from PV(N1) to another intersection point IP2/penumbra vertex PV for edge E1 can be connected via the arc between PV(N1) and PV(N2) to the exterior tangent from PV(N2) to another intersection point IP3/penumbra vertex PV3 for edge E2. Connecting the exterior tangents via arcs can be repeated for all of the projection circles for spot shadow outline polygon SSOP to lead to a penumbra area PENA. In these embodiments, penumbra area PENA may not meet the definition of a polygon, as the arcs are segments of a circle, not line segments; however, in some cases (e.g., cases where arcs are represented as collections of line segments), penumbra area PENA may be used as penumbra PEN.

At block 180 of method 100, the computing device can determine a shadow for occluding polygon OP based on union of umbra UM and penumbra PEN. In some embodiments, a tessellation of the umbra UM and a shadow region between the edge of umbra UM and the edge of the penumbra PEN can be generated. In particular embodiments, transparency values of the vertices of the tessellation inside or on the edge of umbra UM can be set to opaque (not transparent) and transparency values of vertices of the tessellation on the edge of penumbra PEN can be set to transparent. In other cases, other renderable representations for the shadow region rather than a tessellation can be generated. In particular embodiments, the tessellation can be formed using triangles alone.

In other embodiments, either before or after the above-mentioned tessellation, occluding polygon OP can be projected onto receiver surface RS to form an occluding polygon space. Then, to avoid overdraw, any portion of the union of the umbra area and the shadow region that intersects with the occluding polygon space can be deleted from the tessellation.

Figure 2D:
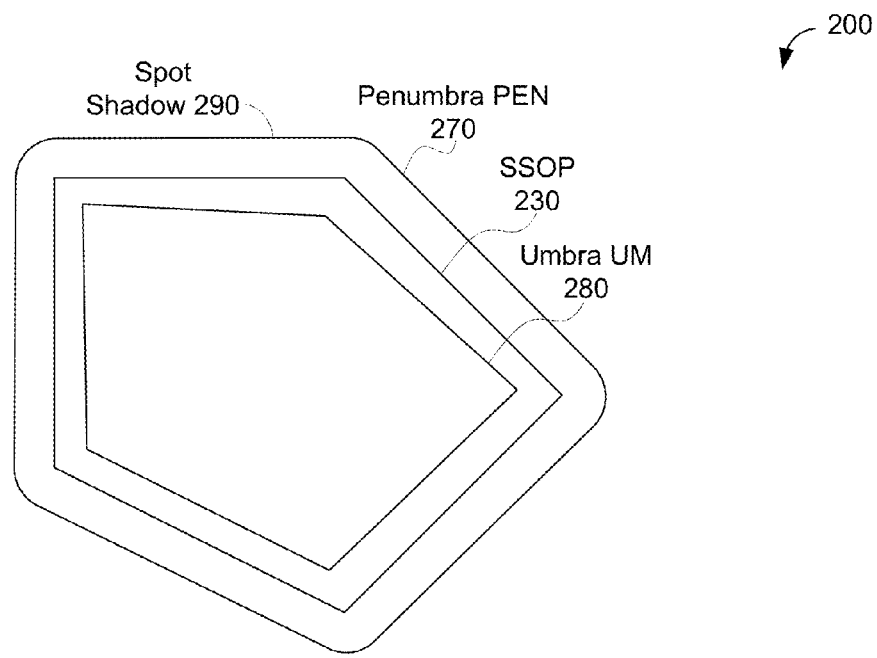
FIG. 2D shows the spot shadow outline polygon of FIG. 2A with a shadow, in accordance with an example embodiment.

For example, FIG. 2D shows example spot shadow 290 for scenario 200 that includes penumbra PEN 270 and umbra UM 280. FIG. 2D also shows spot shadow outline polygon 230 which may or may not be part of spot shadow 290.

Figure 2E:
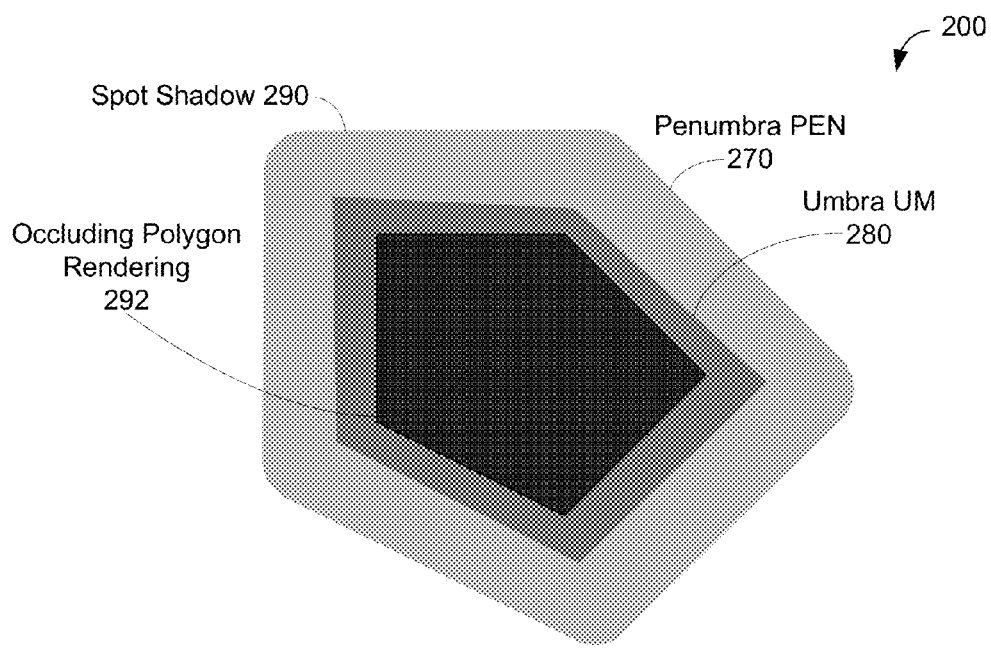
FIG. 2E shows a rendering of the occluding polygon of FIG. 2A and the shadow of FIG. 2D, in accordance with an example embodiment.

At block 190 of method 100, the computing device can generate a display that includes at least a portion of the occluding polygon OP and the shadow. For example, FIG. 2E shows example spot shadow 290 for scenario 200 that includes penumbra PEN 270 and umbra UM 280 rendered along with a rendering 292 of occluding polygon 220.

FIGS. 3A, 3B, 4A, 4B, and 4C show a scenario 300 for simulating shadows. The functionality of scenario 300 can be carried out by hardware of a computing device and/or computer-readable instructions executed by one or more processors of the computing device, such as computing device 1200 discussed below in the context of FIG. 12A.

Figure 3A:
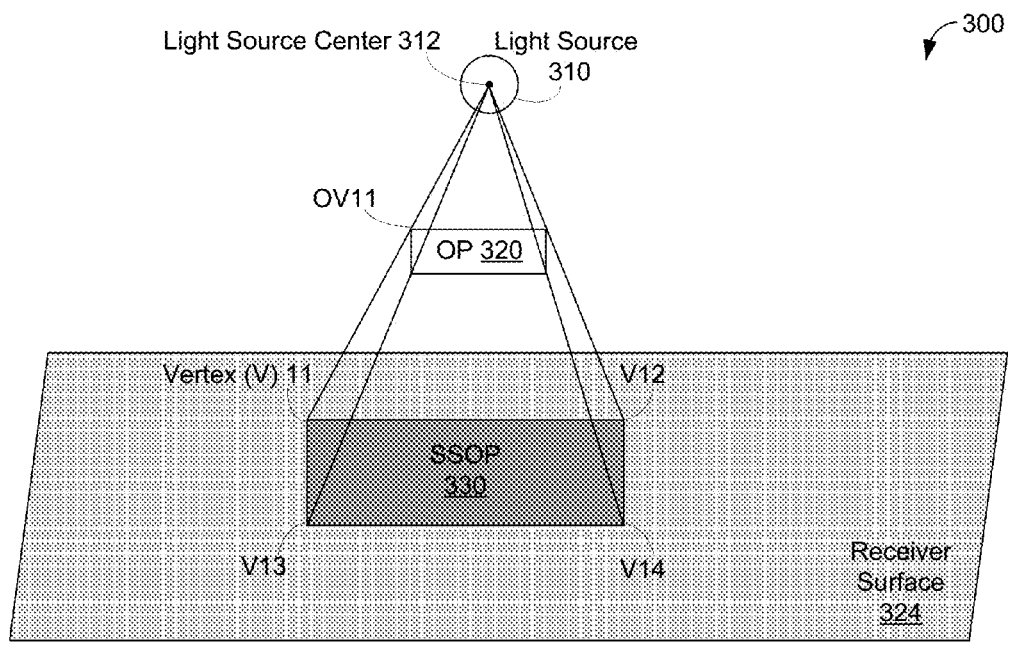
FIG. 3A shows a circular light source emitting light onto an occluding polygon and a corresponding spot shadow outline polygon on a receiver surface, in accordance with an example embodiment.

In FIG. 3A, circular light source 310 is shown with light source center 312 emitting light toward receiver surface 324. Some of the light emitted by circular light source 310 is occluded by occluding polygon 320, which is a rectangle having four vertices. In scenario 300, occluding polygon 320 is parallel to receiver surface 324, and so each of the vertices of occluding polygon has the same height.

Spot shadow outline polygon 330 is determined during scenario 400 by simulated emission of rays of light from light source center 312 of light source 310 that pass through each of the vertices of occluding polygon OP 320 and reach receiver surface 324. For example, FIG. 3A shows a ray of light emitted from light source center 312 passing through vertex OV11 of occluding polygon OP 320 to reach receiver surface 324 at an intersection point, labeled as vertex (V) V11. Similarly, FIG. 3A shows separate rays of light emitted from light source center 212 passing through each other vertex of occluding polygon OP 320 to reach receiver surface 224 at respective intersection points labeled as V12, V13, and V14. Spot shadow outline polygon 330 can then be formed by connecting vertices V11, V12, V13, and V14 with line segments in the plane of receiver surface 324.

Figure 3B:
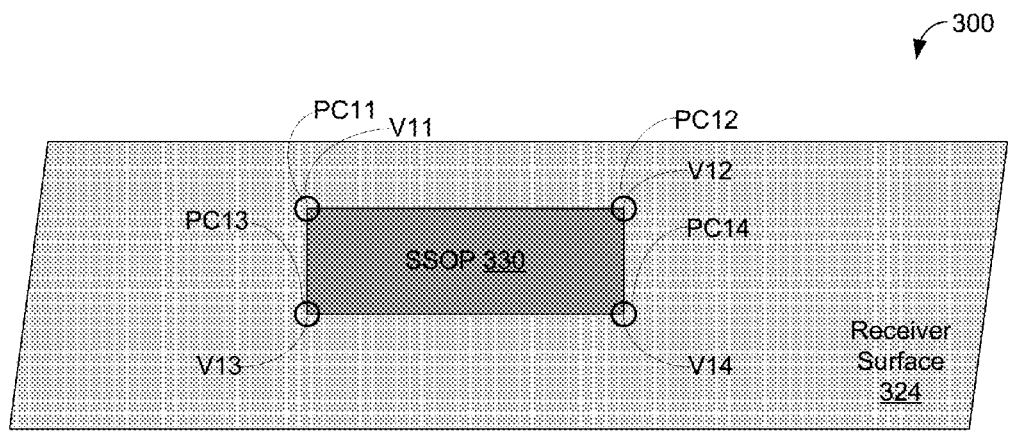
FIG. 3B shows the spot shadow outline polygon of FIG. 3A with projection circles, in accordance with an example embodiment.

FIG. 3B shows the spot shadow outline polygon 330 with projection circles PC11, PC12, PC13, and PC14, in accordance with an example embodiment. In FIG. 3B, each vertex V11, V12, V13, and V14 of spot shadow outline polygon 330 centers of a respective projection circle PC11, PC12, PC13, and PC14. Each of projection circles PC11, PC12, PC13, and PC14 is the same size in scenario 300, as each of, as the heights of the vertices of occluding polygon 320 are the same and the radii of the projection circles in scenario 300 are proportional to the respective heights of the vertices of occluding polygon 320, such as discussed above in more detail with respect to FIG. 2B.

Figure 4A:
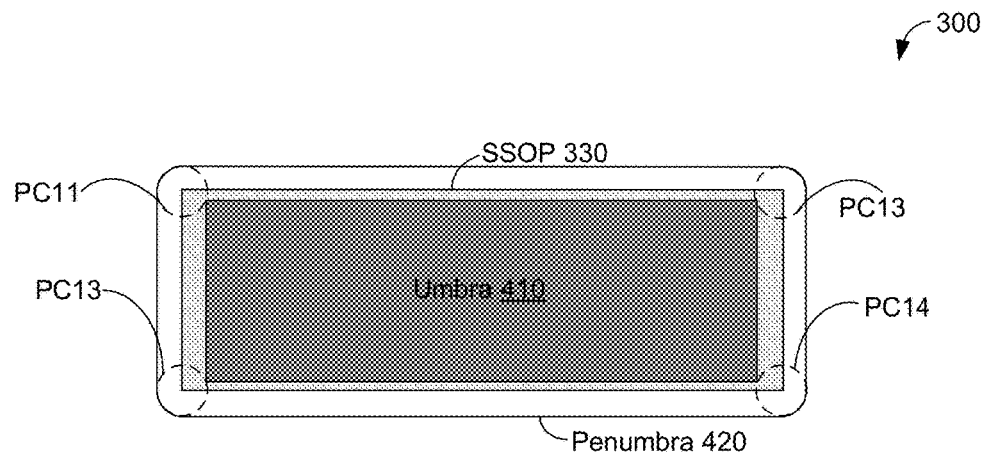
FIG. 4A shows the spot shadow outline polygon of FIG. 3A with an umbra and a penumbra of a shadow, in accordance with an example embodiment.

FIG. 4A shows the spot shadow outline polygon 330 of scenario 300 with umbra 410 and penumbra 420, in accordance with an example embodiment. In scenario 300, umbra 410 is determined by taking a union of interior tangents to projection circles PC11, PC12, PC13, and PC14 and umbra vertices on projection circles PC11, PC12, PC13, and PC14, as discussed above in the context of method 100 and FIG. 1. In scenario 300, penumbra 420 is determined by taking a union of exterior tangents to projection circles PC11, PC12, PC13, and PC14 and arcs between penumbra vertices on projection circles PC11, PC12, PC13, and PC14, as discussed above in the context of method 100 and FIG. 1.

Figure 4B:
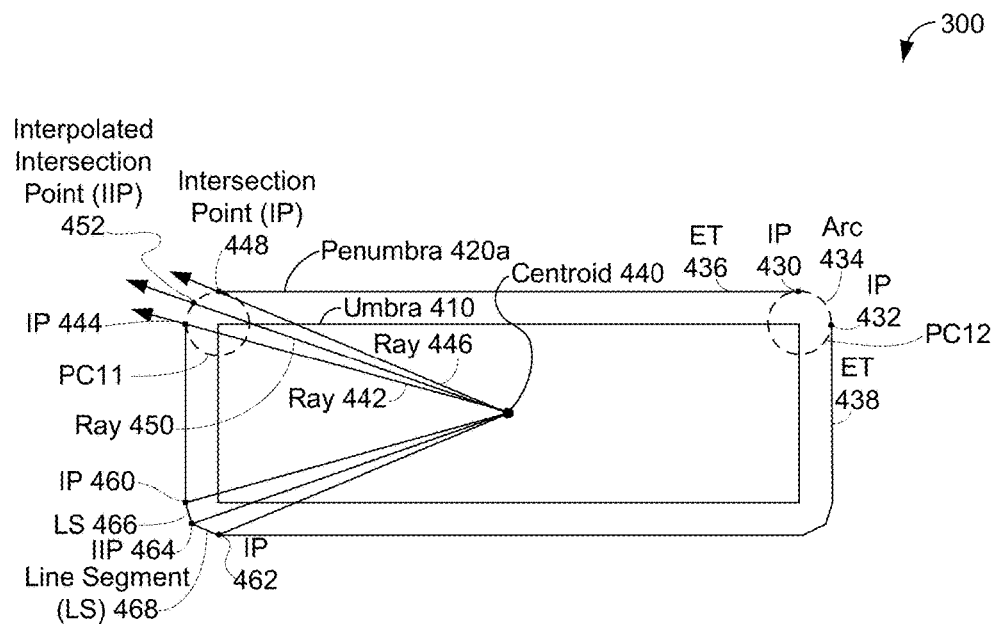
FIG. 4B shows polygonal representation of arcs in used in forming the penumbra of FIG. 4A, in accordance with an example embodiment.

FIG. 4B shows polygonal representation of an arc in used in forming penumbra 420, in accordance with an example embodiment. At upper-right, FIG. 4B shows penumbra 420a including arc 434 of projection circle PC12 between intersection points 430 and 432, where intersection point 430 is a point of intersection between exterior tangent 436 and projection circle PC12, and where intersection point 432 is a point of intersection between exterior tangent 438 and projection circle PC12.

An arc of a projection circle used in a penumbra can be interpolated. For example, in scenario 300, ray 442 is generated that starts at centroid 440 of spot shadow outline polygon 330 and passes through intersection point 444 on projection circle PC11 shown at upper left of FIG. 4B. Also, ray 446 is generated that starts at centroid 440 of spot shadow outline polygon 330 and passes through intersection point 448 on projection circle PC11. To interpolate the arc on projection circle PC11 between intersection points 444 and 448, one or more rays can be generated that starts at centroid 440 and that go between rays 442 and 446. For example, FIG. 4B shows ray 450 goes about halfway between rays 442 and 446 to reach the arc on projection circle PC11 making up penumbra 420 at interpolated intersection point (IIP) 452, which is about halfway between intersection points 444 and 448.

Then, a polygonal representation of an arc can replace use of an arc in a penumbra, and so allow for a polygonal representation of a penumbra. The polygonal representation of an arc of a projection circle that falls between intersection points can involve generating line segments between intersection points and any interpolated intersection point(s) for the arc. For example, at lower left of FIG. 4B, an arc of projection circle PC13 has been replaced by line segments 466 and 468, where line segment 466 lies between intersection point 460 of projection circle PC13 and interpolated intersection point 464, and where line segment 468 lies between interpolated intersection point 464 and intersection point 462 of projection circle PC13. Therefore, line segments 466 and 468 can represent the arc of projection circle PC13, as line segments 466 and 468 as well as the arc of projection circle PC13 can connect an exterior tangent between projection circles PC11 and PC13 with the exterior tangent between projection circles PC13 and PC14.

Intersection points between rays and umbra 410 and penumbra 420a can be used as respective additional umbra vertices and penumbra vertices. For the example of ray 450, interpolated intersection point 452 can be used as an additional penumbra vertex, and the point where ray 450 intersects umbra 410 (just right of the upper-left corner of umbra 410) can be used as an additional umbra vertex.

If umbra 410 and/or penumbra 420a are tessellated, a graphics processor, such as a graphics processing unit (GPU), may be able to easily render the triangles in the tessellation. GPU rendering of shadows can help performance of the computing device, especially mobile devices, since GPUs on mobile devices may have relatively-low pixel filling rates compared to other devices.

Figure 4C:
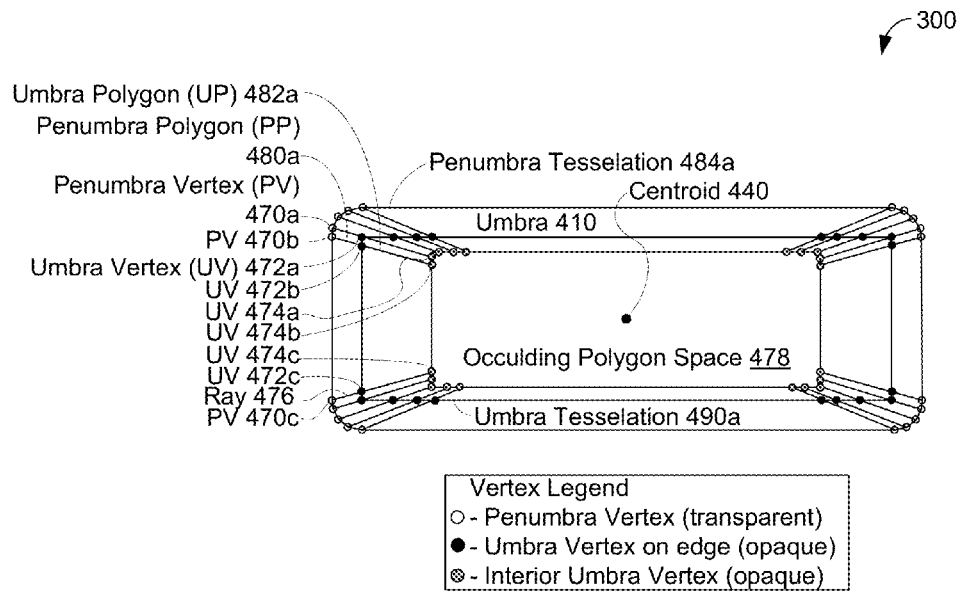
FIG. 4C shows polygonal representations of a penumbra and an umbra of a shadow, in accordance with an example embodiment.

FIG. 4C shows polygonal representations of a penumbra and an umbra of a simulated shadow, in accordance with an example embodiment. In particular, FIG. 4C shows penumbra tessellation 484a and umbra tessellation 490a.

An empty space representing an occluding polygon can be reserved before/during shadow generation or the empty space can be cut out of the shadow generation. In scenario 300, a spot shadow of occluding polygon 320 is generated from penumbra tessellation 484a and umbra tessellation 490a. Then, occluding polygon space 478 of FIG. 4C can be an empty space for rendering occluding polygon 320 that is reserved during generation of penumbra tessellation 484a and/or umbra tessellation 490a or is cut out from the resulting shadow after tessellation. Occluding polygon space 478 can be reserved to avoid overdraw of pixels by both rendering of the shadow; e.g., penumbra tessellation 484a and/or umbra tessellation 490a, and by rendering of occluding polygon 320. In scenario 300, occluding polygon 320 can be rendered in occluding polygon space 478, an umbra for a spot shadow of occluding polygon 320 can be rendered using umbra tessellation 490a, and a penumbra for the spot shadow can be rendered using penumbra tessellation 484a.

Penumbra tessellation 484a includes twenty penumbra vertices (PVs), including penumbra vertices 470a, 470b at the upper-left corner of penumbra tessellation 484a and penumbra vertex 470c at the lower-left corner of penumbra tessellation 484a. The penumbra vertices for penumbra tessellation 484a are shown in FIG. 4C using small unfilled circles outlined in black.

Figure 4D:
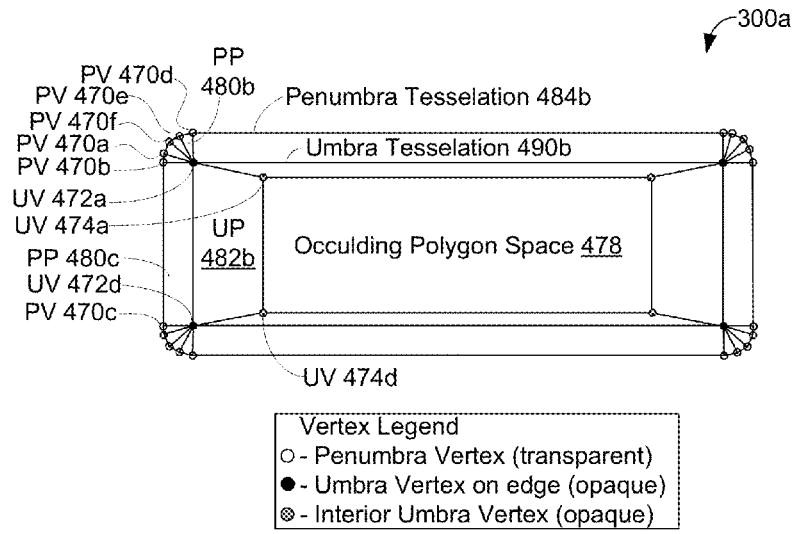
FIG. 4D shows additional polygonal representations of a penumbra and an umbra of a shadow, in accordance with an example embodiment.

Umbra tessellation 490a includes forty umbra vertices (UVs) including umbra vertices 472a, 472b at upper-left of the boundary of umbra tessellation 490a and umbra vertex 472c at lower-left of the boundary of umbra tessellation 490a. Umbra tessellation 490a also includes umbra vertices 474a, 474b at upper-left of the boundary of occluding polygon space 478 and umbra vertex 474c at lower-left of the boundary of occluding polygon space 478. FIG. 4D shows umbra vertices of the boundary of umbra tessellation 490a using small black circles and the umbra vertices on the boundary of occluding polygon space 478 using small grey circles outlined in black.

Penumbra and umbra vertices can be generated for respective penumbra tessellation 484a and umbra tessellation 490a by emitting rays from centroid 440 outward and determining intersection points between the rays and the respective penumbra and umbra boundaries. In scenario 300, occluding polygon space 478 is contained within the boundary of umbra tessellation 490a. Then, in scenario 300, additional umbra vertices can be determined by determining intersection points between the rays and the boundary of occluding polygon space 478. In other scenarios where occluding polygon space 478 is at least partially within the boundary of penumbra tessellation 484a, intersection points between the rays and the boundary of occluding polygon space 478 may be penumbra vertices.

To generate penumbra tessellation 484a and umbra tessellation 490a, twenty rays—five for each arc in penumbra 420 of FIG. 4A—are emitted from centroid 440 to both umbra and penumbra vertices, including the additional interpolated intersection points for each projection circle arc in penumbra 420, so that rays are emitted for twenty total penumbra vertices. Additional umbra vertices can be generated where the rays intersect the boundary of umbra tessellation 490a. In scenario 300, additional umbra vertices are also generated where the rays intersect the boundary of occluding polygon space 478.

Then, the penumbra and umbra vertices for each ray can be connected. The portions of each emitted ray that connect vertices are shown in FIG. 4C. For example, ray 476 connects umbra vertices 472c and 474c, and also connects umbra vertex 472c with penumbra vertex 470c. These connections, the boundary of umbra tessellation 490a, and the boundary of occluding polygon space 478, divide umbra tessellation 490a into twenty quadrangles. FIG. 4C shows an example umbra polygon (UP) 482a as a quadrangle whose sides are: (1) a portion of a ray connecting umbra vertices 472a and 474a, (2) a portion of the boundary of occluding polygon space 478 between umbra vertices 474a and 474b, (3) a portion of a ray connecting umbra vertices 474b and 472b, and (4) a portion of the boundary of umbra tessellation 490a between umbra vertices 472a and 472b.

In scenario 300, the connections between vertices, the boundary of umbra tessellation 490a, and the boundary of penumbra tessellation 484a divide penumbra tessellation 484a into twenty quadrangles. FIG. 4C shows an example penumbra polygon (PP) 480a as a quadrangle whose sides are: (1) a portion of a ray connecting penumbra vertex 470b and umbra vertex 472b, (2) a portion of the boundary of umbra tessellation 490a between umbra vertices 472a and 472b, (3) a portion of a ray connecting umbra vertex 472a and penumbra vertex 470a, and (4) a portion of the boundary of penumbra tessellation 484a between penumbra vertices 470a and 470b.

In other scenarios, some or all of quadrangles in umbra tessellation 490a and/or penumbra tessellation 484a can be converted to triangles. A convex quadrangle, such as penumbra polygon 480a or umbra polygon 482a, can be tessellated into two triangles by a line connecting a pair of non-adjacent vertices. In the example of penumbra polygon 480a, there are two pairs of non-adjacent vertices: (1) penumbra vertex 470a and umbra vertex 472b, and (2) penumbra vertex 470b and umbra vertex 472a. By drawing a line between penumbra vertex 470a and umbra vertex 472b, penumbra polygon 480a can be divided into two triangles. One of the two triangles is bounded by: (1a) the portion of the boundary of umbra tessellation 490a between umbra vertices 472a and 472b, (1b) the portion of the ray connecting umbra vertex 472a and penumbra vertex 470a, and (1c) the line between penumbra vertex 470a and umbra vertex 472b. Another of the two triangles is bounded by: (2a) the portion of the ray connecting penumbra vertex 470b and umbra vertex 472b, (2b) the portion of the boundary of penumbra tessellation 484a between penumbra vertices 470a and 470b, and (2c) the line between penumbra vertex 470a and umbra vertex 472b.

In some embodiments, transparency values for umbra vertices and penumbra vertices cam be selected to simulate blending of shadows with the environment. For example, umbra vertices can have transparency values representing near or complete opaqueness (no transparency); i.e., a zero or a relatively-low transparency value, while penumbra vertices can have transparency values representing near or complete transparency; i.e., a maximum or a relatively-high transparency value.

Another tessellation technique can include taking each penumbra vertex, finding the closest umbra vertex, and connecting the two vertices with a connecting line. Then, as both the penumbra area represented by penumbra tessellation 484a and the umbra area represented by umbra tessellation 490a are convex polygons, the set of connecting lines and the borders of the umbra and penumbra areas lead to a tessellation of a spot shadow region, made up of a union of the umbra and penumbra tessellations, using triangles and/or convex quadrangles.

FIG. 4D shows polygonal representations of a penumbra and an umbra of a simulated shadow, in accordance with an example embodiment. In particular, FIG. 4D shows penumbra tessellation 484b and umbra tessellation 490b for scenario 300a. Scenario 300a is an alternative scenario to scenario 300 that is the same as scenario 300 until umbra and penumbra tessellation. Rather than using the tessellation technique of scenario 300 discussed above in the context of FIG. 3C, scenario 300a uses the tessellation technique discussed in the paragraph immediately above.

In scenario 300a, occluding polygon space 478 of FIG. 4D can be an empty space for rendering occluding polygon 320 that is reserved during generation of penumbra tessellation 484b and/or umbra tessellation 490b or is cut out from the resulting shadow after tessellation, such as discussed above in the context of scenario 300 and FIG. 3C. Occluding polygon space 478 is the same shape and size in both scenarios 300 and 300a, as light source 310 and occluding polygon OP 320 are the same for both scenarios. In scenario 300a, occluding polygon 320 can be rendered in occluding polygon space 478, an umbra for a spot shadow of occluding polygon 320 can be rendered using umbra tessellation 490b, and a penumbra for the spot shadow can be rendered using penumbra tessellation 484b.

Penumbra tessellation 484b includes twenty penumbra vertices, including penumbra vertices 470a, 470b, 470d, 470e, 470f at the upper-left corner of penumbra tessellation 484b and penumbra vertex 470c at the lower-left corner of penumbra tessellation 484b. The penumbra vertices for penumbra tessellation 484b are shown in FIG. 4D using small unfilled circles outlined in black.

In scenario 300a, eight umbra vertices are selected for umbra tessellation 490b: the four vertices of umbra 410, which are on the boundary of umbra tessellation 490b, and the four vertices of occluding polygon space 478. Umbra tessellation 490b includes eight umbra vertices including umbra vertex 472a at the upper-left corner of the boundary of umbra tessellation 490b and umbra vertex 472d at the lower-left corner of the boundary of umbra tessellation 490b. Umbra tessellation 490b also includes umbra vertices 472a at the upper-left corner of the boundary of occluding polygon space 478 and umbra vertex 474d at the lower-left corner of the boundary of occluding polygon space 478. FIG. 4D shows the four vertices of umbra 410 using small black circles and the umbra vertices on the boundary of occluding polygon space 478 using small grey circles outlined in black.

Scenario 300a continues by taking each penumbra vertex, finding the closest umbra vertex, and connecting the two vertices with a connecting line. For example, for each of penumbra vertices 470a, 470b, 470d, 470e, and 470f, the closest umbra vertex is umbra vertex 472a, and so connecting lines are drawn between umbra vertex 472a and each of penumbra vertices 470a, 470b, 470d, 470e, and 470f, as shown at upper-left of FIG. 4D. As another example, the closest umbra vertex to penumbra vertex 470c is umbra vertex 472d, and so a connecting line is drawn between penumbra vertex 470c and umbra vertex 472d, as shown at lower-left of FIG. 4D.

In scenario 300a, each vertex of occluding polygon space 478 is connected to a nearest umbra vertex on the boundary of umbra tessellation 490b. For example, a connecting line is drawn between umbra vertex 474a, which is an upper-left vertex of occluding polygon space 478, and umbra vertex 472a, which is the closest umbra vertex on the boundary of umbra tessellation 490b as shown in FIG. 4D. FIG. 4D also shows a connecting line is drawn between umbra vertex 474d, which is a lower-left vertex of occluding polygon space 478, and umbra vertex 472d, which is the closest umbra vertex on the boundary of umbra tessellation 490b.

Then, as both the penumbra area represented by penumbra tessellation 484b and the umbra area represented by umbra tessellation 490b are convex polygons, the connecting lines and the borders of the umbra and penumbra tessellations can tessellate a spot shadow region, made up of a union of the umbra and penumbra tessellations, using triangles and/or convex quadrangles. For example, penumbra tessellation 484b includes twenty penumbra polygons which include sixteen triangles and four quadrangles. As examples, FIG. 4D shows penumbra polygon 480b as an example triangular penumbra polygon at upper-left and penumbra polygon 480b as an example quadrangular penumbra polygon at center-left. Umbra tessellation 490b includes four quadrangles, such as umbra polygon 482b at center-left of FIG. 4D.

In other scenarios, some or all of quadrangles in umbra tessellation 490a and/or penumbra tessellation 484a can be converted to triangles. A convex quadrangle, such as penumbra polygon 480a or umbra polygon 482a, can be tessellated into two triangles by a line connecting a pair of non-adjacent vertices, such as discussed above in the context of FIG. 4C and scenario 300.

In some embodiments, transparency values for umbra vertices and penumbra vertices can be selected can be used to simulate blending of shadows with the environment such as discussed above in the context of FIG. 4C and scenario 300.

Figure 5:
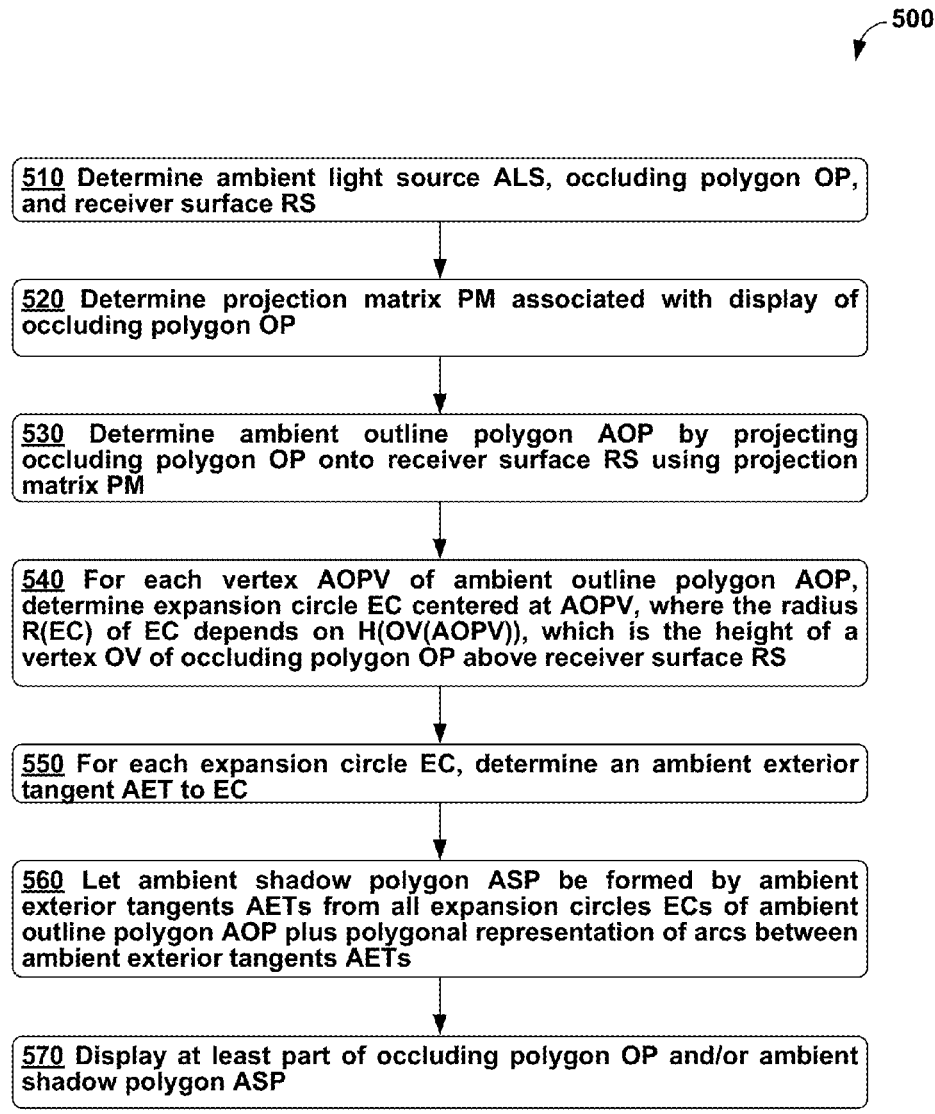
FIG. 5 is a flow chart illustrating a method for generating a display including a shadow, in accordance with an example embodiment.

A similar approach to method 100 can be used to simulate shadows cast by ambient light. FIG. 5 is a flow chart illustrating method 500 for generating a display including a shadow, in accordance with an example embodiment. Method 500 and the functionality of scenario 600 can be carried out by hardware of a computing device and/or computer-readable instructions executed by one or more processors of the computing device, such as computing device 1200 discussed below in the context of FIG. 12A. Method 500 can begin at block 510, where the computing device can determine a simulated ambient light source ALS, a simulated occluding polygon OP, and a simulated receiver surface RS, where receiver surface RS is a two-dimensional (2D) surface, and where occluding polygon OP is between ambient light source ALS and receiver surface RS. In some scenarios, ambient light source ALS can be represented as a very large or infinitely-sized planar or dome-shaped light source which can emit light in all directions equally.

At block 520, the computing device can determine a projection matrix PM associated with display of occluding polygon OP. Projection matrix PM can be used to transform 2D and/or three-dimensional (3D) shapes specified in a viewing space or volume to a 2D space, such as receiver surface RS or a screen space that can be displayed, or easily transformed to display, objects in the viewing space or volume. An example screen space is a 2D grid of pixels. In particular, the 2D grid of pixels can be a displayable object, such as, but not limited to, an image file, part or all of a video frame, part or all of an animation, graphical or other displayable object of a screen or display controlled by the computing device, and/or part or all of a GUI controlled by the computing device. Other displayable objects are possible as well. In some embodiments, a projection of the viewing space onto a 2D space can be rendered for display; i.e., converted or otherwise transformed into a displayable object.

For example, the circular light source, occluding polygon OP, and receiver surface RS can be specified in viewing space or volume coordinates, transformed for viewing in screen space using projection matrix PM, and the screen space can be specified as, or be easily converted to, a 2D grid of pixels that are equivalent to a display of the computing device. As another example, projection matrix PM can be configured to determine projections of objects in the viewing space onto a 2D plane in the viewing space, such as receiver surface RS, and then a display can be generated from the 2D plane; e.g., receiver surface RS can be mapped to screen space. Projection matrix PM can be used to determine one or more transformations, such as one or more perspective transformations, affine transformations, and/or orthographic transformations, of coordinates specified in the viewing space or volume to coordinates specified in the screen space. Other projection matrices PM are possible as well.

At block 530, the computing device can determine ambient outline polygon AOP by projecting occluding polygon OP onto receiver surface RS using projection matrix PM. In some embodiments, receiver surface RS can act as an equivalent surface to and/or be the screen space for projection matrix PM.

At block 540, the computing device can, for each vertex AOPV of ambient outline polygon AOP, determine an expansion circle EC. The expansion circle EC can be centered at AOPV and have a radius R(PC) that depends on H(OV(AOPV)), where H(OV(AOPC)) is the height of a vertex OV of occluding polygon OP above receiver surface RS, and where vertex OV is associated with ambient outline vertex AOPV. For example, if a particular vertex OVpp of occluding polygon OP is projected onto receiver surface RS at a point Ppp on receiver surface RS, then the point Ppp should correspond to a vertex AOPVpp of ambient outline polygon AOP, and so vertex OVpp of occluding polygon OP can be associated with vertex AOPVpp of ambient outline polygon AOP.

At block 550, the computing device can, for each expansion circle EC, determine one or more exterior tangents AET. That is, for each expansion circle EC, the computing device can determine normals to the edges of the ambient outline polygon AOP associated with the vertex of the ambient outline polygon at the center of the expansion circle. For each normal, draw a ray in a direction of the normal away from ambient outline polygon AOP, and take an exterior tangent to the expansion circle at an "ambient vertex" where the ray intersects the expansion circle.

Figure 6A:
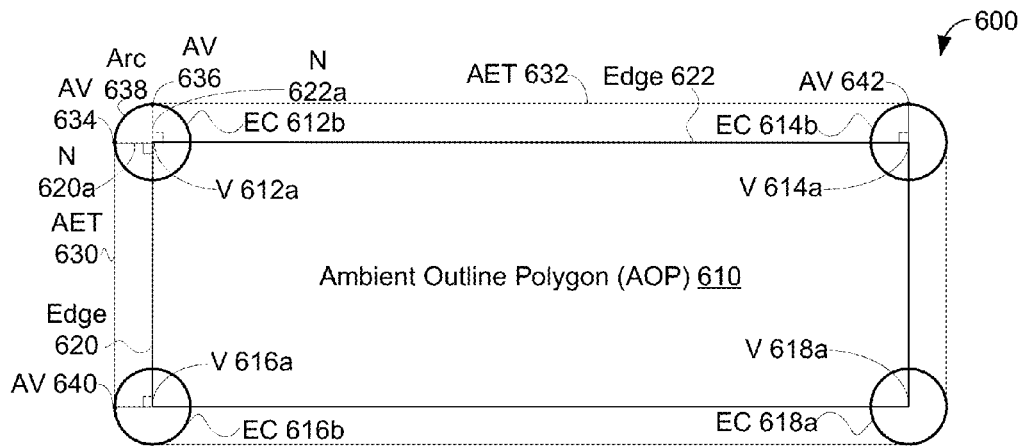
FIG. 6A shows an ambient outline polygon with expansion circles and ambient exterior tangents, in accordance with an example embodiment.

For example, FIG. 6A shows scenario 600 where an example ambient outline polygon AOP 610 has been generated by projecting a rectangular occluding polygon (not shown in FIG. 6A) onto a receiver surface using a projection matrix. Ambient outline polygon AOP 610 has four vertices 612*a*, 614*a*, 616*a*, and 618*a*. In scenario 600, each of vertices 612*a*, 614*a*, 616*a*, and 618*a* centers a corresponding respective expansion circle 612*b*, 614*b*, 616*c*, and 618*a*. In scenario 600, the occluding polygon is parallel to the receiver surface, and so all vertices of the occluding polygon have equal heights above the receiver surface. Also in scenario 600, the radius R(EC) of each expansion circle EC is proportional to the height of the corresponding occluding polygon vertex above the receiver surface; e.g., R(EC) =p2*H(OV(APOV)), where p2>0 is a constant of proportionality used throughout scenario 600, and H(OV(AOPV)) is the height H of the occluding polygon vertex OV corresponding to a particular ambient outline polygon vertex AOPV, and so each expansion circle EC in scenario 600 has the same radius.

FIG. 6A shows ambient outline polygon AOP 610 having vertex 612*a* at the center of expansion circle 612*b*. Vertex 612*a* is an endpoint of edges 620 and 622 of ambient outline polygon AOP 610, with edge 620 having normal 620*a* and edge 622 having normal 622*a*. In scenario 600, a ray drawn in the direction of normal 620*a* from vertex 612*a* (at the center of expansion circle 612*b*) away from ambient outline polygon AOP 610 reaches expansion circle 612*b* at ambient vertex (AV) 634. In scenario 600, a ray drawn in the direction of normal 622*a* from vertex 612*a* away from ambient outline polygon AOP 610 reaches expansion circle 612*b* at ambient vertex 636.

FIG. 6A shows ambient exterior tangent (AET) 630 drawn between ambient vertex 634 and ambient vertex 640, with ambient vertex 640 located where a ray in the direction of normal 620*a* intersects with expansion circle 616*b* outside of ambient outline polygon AOP 610, and shows ambient exterior tangent 632 drawn between ambient vertex 636 and ambient vertex 642, which is located where a ray in the direction of normal intersects with expansion circle 614*b* outside of ambient outline polygon AOP 610. Exterior tangents 630 and 632 can be connected using arc 638 of expansion circle 612*b* between ambient vertices 634 and 636.

Figure 6B:
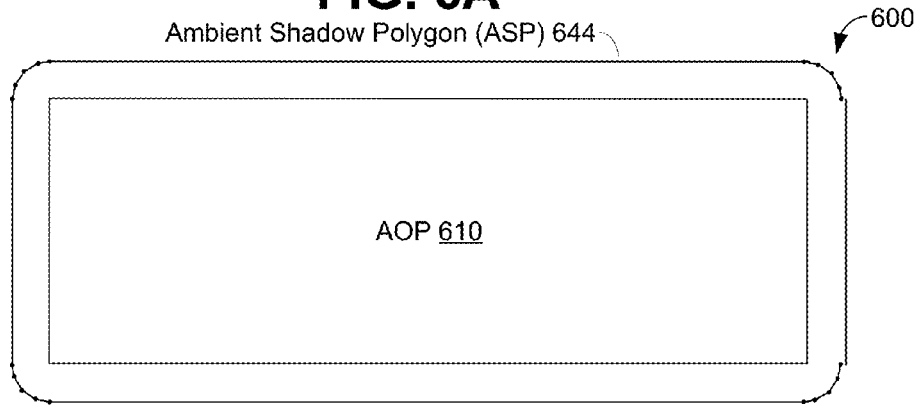
FIG. 6B shows an ambient shadow polygon with the ambient outline polygon of FIG. 6A, in accordance with an example embodiment.

At block 560 of method 500, the computing device can form ambient shadow polygon ASP by taking a union of ambient exterior tangents AETs from all expansion circles ECs of ambient outline polygon AOP and polygonal representations of all arcs between ambient exterior tangents. In some embodiments, an ambient shadow space can replace ambient shadow polygon ASP, where the ambient shadow space is not a polygon; e.g., the arcs between ambient exterior tangents can be retained in forming the ambient shadow space, rather than being replaced by polygonal representations. FIG. 6B shows example ambient shadow polygon 644 for scenario 600, with each arc along an expansion circle replaced with four line segments using three interpolated intersection points between ambient vertices, such as discussed above in the context of a penumbra PEN of block 170 of method 100.

Figure 6C:
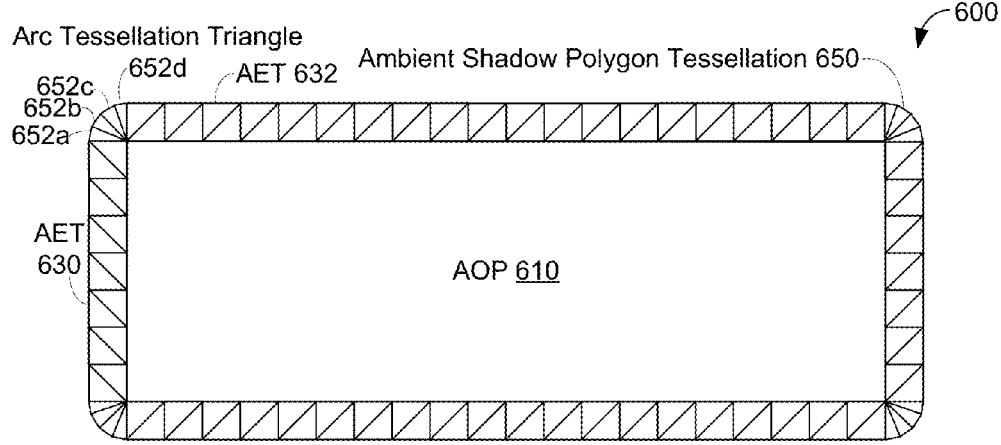
FIG. 6C shows a tessellation of the ambient shadow polygon of FIG. 6B, in accordance with an example embodiment.

Tessellation can be used to determine a detailed ambient shadow polygon. FIG. 6C shows example ambient shadow polygon tessellation 650 for scenario 600, with ambient shadow polygon tessellation 650 made up of triangles representing a region between ambient outline polygon 610 and the edge of the ambient shadow polygon 644.

Tessellation 650 shows ambient exterior tangents 630 and 632 connected by edges of arc tessellation triangles 652*a*, 652*b*, 652*c*, and 652*d*. As mentioned above, each arc of an expansion circle has been replaced in ambient shadow polygon 644 with four line segments using three interpolated intersection points. For example, the vertices of tessellation triangle 652*a* include vertex 612*a*, ambient vertex 634, and a first interpolated intersection point that lies on arc 638 between ambient vertices 634 and 636. The vertices of tessellation triangle 652*b* include vertex 612*a*, the first interpolated intersection point, and a second interpolated intersection point on arc 638 between the first interpolated intersection point and ambient vertex 636. The vertices of tessellation triangle 652*c* include vertex 612*a*, the second interpolated intersection point, and a third interpolated intersection point on arc 638 between the second interpolated intersection point and ambient vertex 636. The vertices of tessellation triangle 652*d* include vertex 612*a*, the third interpolated intersection point, and ambient vertex 636. In scenario 600, ambient shadow polygon 644 and ambient shadow polygon tessellation used similar techniques to replace arcs of expansion circles 614*b*, 616*b*, and 618*b* with line segments as was used to replace arc 638 of expansion circle 612*b*.

In particular embodiments, transparency values of vertices of tessellation 650 inside or on the edge of the ambient outline polygon can be set to an opaque (or not transparent) value, a value representing relatively-low transparency, a value based on a height of a corresponding vertex, or some other value(s). In still other embodiments, transparency values of vertices of the tessellation on the edge of ambient shadow polygon 644 can be set to a transparent value, a value representing relatively-low transparency, or some other value. In other cases, other renderable representations for the shadow region rather than a tessellation can be generated.

At block 570 of method 500, the computing device can generate a rendering of at least a portion of the occluding polygon and/or ambient shadow polygon ASP, and the display the generated rendering.

FIGS. 7A-7E show scenario 700. The functionality of scenario 700 can be carried out by hardware of a computing device and/or computer-readable instructions executed by one or more processors of the computing device, such as computing device 1200 discussed below in the context of FIG. 12A.

Figure 7A:
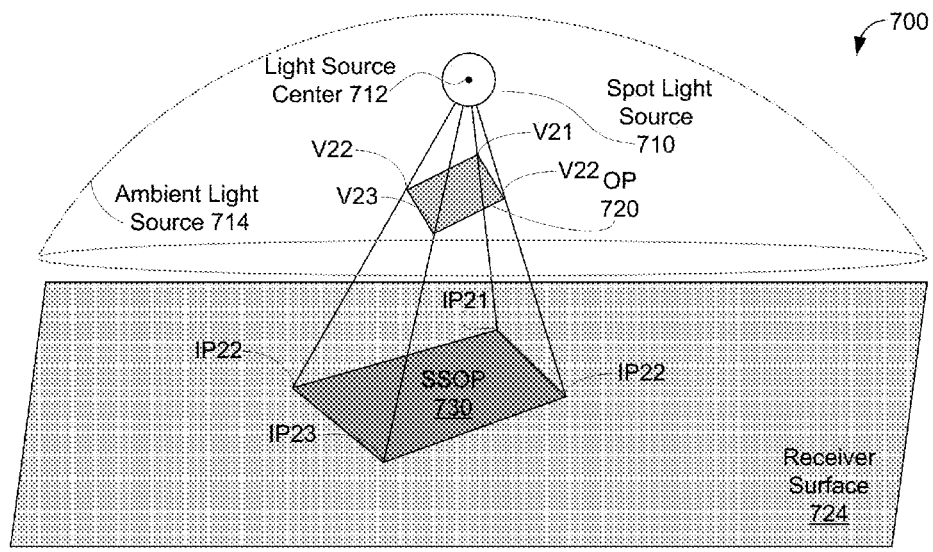
FIG. 7A shows a circular light source and an ambient light source emitting light onto an occluding polygon and a corresponding spot shadow outline polygon on a receiver surface, in accordance with an example embodiment.

As seen in FIG. 7A, scenario 700 involves circular light source 710 and ambient light source 714 emitting light onto occluding polygon 720 and corresponding spot shadow outline polygon 730 on receiver surface 724, in accordance with an example embodiment. Ambient light source 714 as shown in FIG. 7A is a representation of a large dome-shaped light source emitting light in all directions equally.

Occluding polygon 720 has four vertices: V21, V22, V23, and V24. Spot shadow outline polygon 730 is determined in scenario 700 by simulated emission of rays of light from light source center 712 of light source 710 that pass through each of vertices V21, V22, V23, and V24 of occluding polygon OP 720 and reach receiver surface 724 and to reach receiver surface 224 at respective intersection points IP21, IP22, IP23, and IP24. Spot shadow outline polygon 730 can then be formed by connecting intersection points IP21, IP22, IP23, and IP24 with line segments in the plane of receiver surface 224.

Figure 7B:
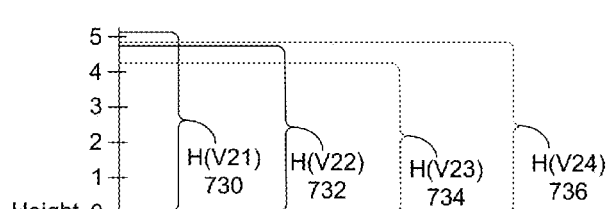
FIG. 7B shows heights of vertices of above the receiver surface of FIG. 7A, in accordance with an example embodiment.

FIG. 7B shows heights of vertices V21, V22, V23, and V24 above receiver surface 724, in accordance with an example embodiment. In scenario 700, each vertex V21, V22, V23, and V24 of occluding polygon OP 720 has a different height measured with respect to receiver surface 724. FIG. 7B shows that the height 730 of vertex V21, H(V21), is approximately 5.1 units, height 732 of vertex V22, H(V22), is approximately 4.7 units, height 734 of vertex V23, H(V23), is approximately 4.2 units, and height 736 of vertex V24, H(V24), is approximately 4.8 units.

Figure 7C:
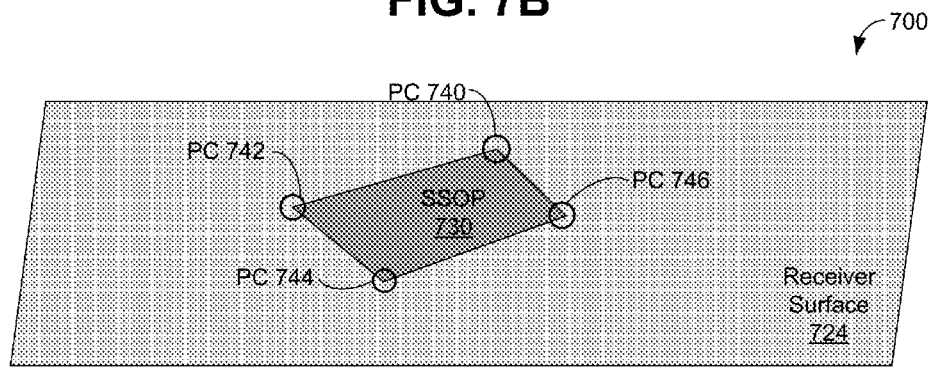
FIG. 7C shows the spot shadow outline polygon of FIG. 7A with projection circles, in accordance with an example embodiment.

FIG. 7C shows the spot shadow outline polygon 730 with projection circles 740, 742, 744, and 746, in accordance with an example embodiment. In scenario 700, the radius R of each projection circle PC is proportional to H(OV(SSOPV)); that is R=p3*H(OV(SSOPV)), where p3>0 is a constant of proportionality used throughout scenario 700, and where H(OV(SSOPV)) is a height above receiver surface 724 of an occluding vertex OV associated with a spot shadow outline polygon vertex SSOPV.

For example, spot shadow outline polygon 730 has vertices IP21, IP22, IP23, and IP24, with vertices IP21, IP22, IP23, and IP24 of spot shadow outline polygon 730 associated with respective vertex V21, V22, V23, and V24 of occluding polygon 720. In scenario 700, vertex V23 has the smallest height value of 4.2 for the occlusion vertices, so if the radius of projection circle 744 for associated vertex IP23 is normalized to a value of 1 radius unit, then the corresponding radii of projection circles 740, 742, and 746 are respectively 1.21 radius units, 1.12 radius units, and 1.14 radius units long.

Figure 7D:
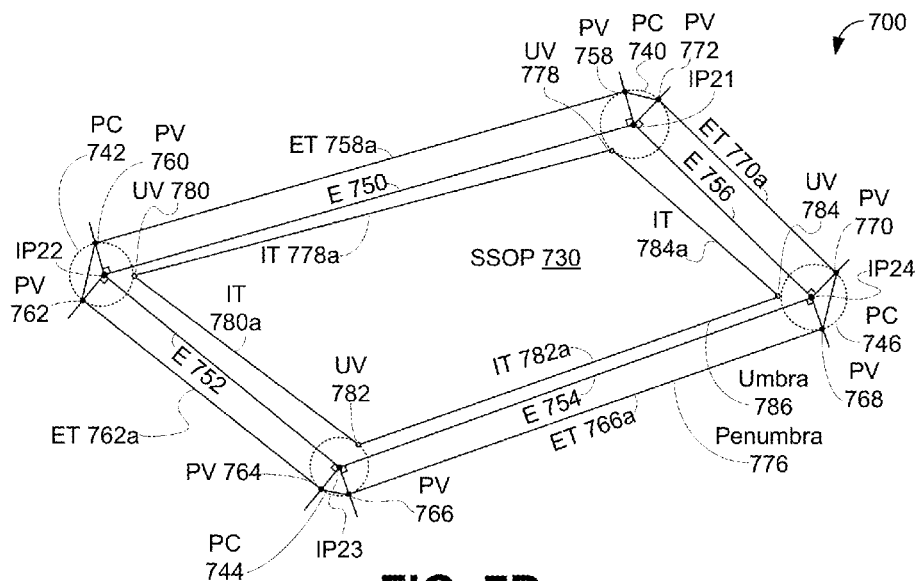
FIG. 7D shows the spot shadow outline polygon of FIG. 7A with an umbra and penumbra of a shadow, in accordance with an example embodiment.

FIG. 7D shows the spot shadow outline polygon 730 with umbra 786 and penumbra 776, in accordance with an example embodiment. Spot shadow outline polygon 730 is shown with four edges: edge 750 between vertices IP21 and IP22, edge 752 between vertices IP22 and IP23, edge 754 between vertices IP23 and IP24 and edge 756 between vertices IP24 and IP21.

In scenario 700, penumbra 776 and umbra 786 are generated using the techniques of method 100 discussed above in the context of FIG. 1. In particular, penumbra 776 is shown in FIG. 7D made up of a convex hull of penumbra vertices 758, 760, 762, 764, 766, 768, 770, and 772, with penumbra vertices 758 and 772 on projection circle 740 with radius of 1.21 radius units and associated with IP21, penumbra vertices 760 and 762 on projection circle 742 with radius of 1.12 radius units and associated with IP22, penumbra vertices 764 and 766 on projection circle 744 with radius of 1.00 radius units and associated with IP23, and penumbra vertices 768 and 770 on projection circle 746 with radius of 1.14 radius units and associated with IP24.

FIG. 7D also shows that penumbra 776, made up of the convex hull of projection vertices 758, 760, 762, 764, 766, 768, 770, and 772, include four exterior tangents: exterior tangent 758a connecting penumbra vertices 758 and 760, exterior tangent 762a connecting penumbra vertices 762 and 764, exterior tangent 766a connecting penumbra vertices 766 and 768, and exterior tangent 770a connecting penumbra vertices 770 and 774. As part of the convex hull of penumbra vertices making up penumbra 776, penumbra 776 also includes four additional line segments: a line segment between penumbra vertices 758 and 772 connecting exterior tangents 758a and 770a and being a polygonal representation of an arc of projection circle 740, a line segment between penumbra vertices 760 and 762 connecting exterior tangents 758a and 762a and being a polygonal representation of an arc of projection circle 742, a line segment between penumbra vertices 764 and 766 connecting exterior tangents 762a and 766a and being a polygonal representation of an arc of projection circle 744, and a line segment between penumbra vertices 768 and 770 connecting exterior tangents 766a and 770a and being a polygonal representation of an arc of projection circle 746.

FIG. 7D shows umbra 786 includes four interior tangents 778a, 780a, 782a, and 784a, where interior tangent 778a connects umbra vertex 778 on projection circle 740 and umbra vertex 780 on projection circle 742, interior tangent 780a connects umbra vertex 780 and umbra vertex 782 on projection circle 744, interior tangent 782a connects umbra vertex 782 and umbra vertex 784 on projection circle 746, and interior tangent 784a connects umbra vertices 784 and umbra vertex 778.

Figure 7E:
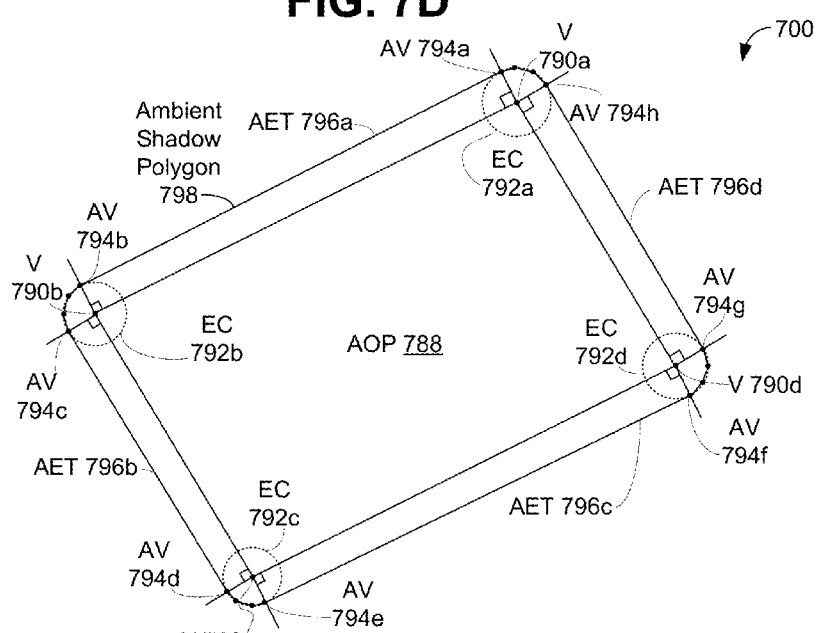
FIG. 7E shows an ambient outline polygon and an ambient shadow polygon, in accordance with an example embodiment.

FIG. 7E shows ambient outline polygon 788 and ambient shadow polygon 798, in accordance with an example embodiment. In scenario 700, ambient outline polygon 788 and ambient shadow polygon are generated using the techniques of method 500 discussed above in the context of FIG. 5. Ambient outline polygon 788 has four vertices 790a, 790b, 790c, and 790d. In scenario 700, vertex 790a is a projection of vertex V21 of occluding polygon 720 onto receiver surface 724, vertex 790b is a projection of vertex V22 of occluding polygon 720 onto receiver surface 724, vertex 790c is a projection of vertex V23 of occluding polygon 720 onto receiver surface 724, and vertex 790d is a projection of vertex V24 of occluding polygon 720 onto receiver surface 724.

Each of vertices 790a, 790b, 790c, and 790d is a center of an expansion circle—FIG. 7E shows that vertex 790a is the center of expansion circle 792a, vertex 790b is the center of expansion circle 792b, vertex 790c is the center of expansion circle 792c, and vertex 790d is the center of expansion circle 792d. In scenario 700, the radius R of each expansion circle EC is proportional to H(OV(AOPV)); that is R=p4*H(OV(AOPV)), where p4>0 is a constant of proportionality used throughout scenario 700, and where H(OV(AOPV)) is a height above receiver surface 724 of occluding vertex OV associated with an ambient outline polygon vertex AOPV. As mentioned above, each vertex of occluding polygon 720 has a different height, with vertex V23 of occluding polygon 720 having a smallest height value of 4.2 units among the vertices of occluding polygon 720, and with vertex V23 associated with vertex 790c of ambient outline polygon 788. So if the radius of expansion circle 792c for associated vertex 790c is normalized to a value of 1 radius unit, then the corresponding radii of expansion circles 790a, 790b, and 790d are respectively 1.21 radius units, 1.12 radius units, and 1.14 radius units.

In scenario 700, ambient shadow polygon 798 includes four ambient exterior tangents: ambient exterior tangent 796a connecting ambient vertices 794a and 794b, ambient exterior tangent 796b connecting ambient vertices 794c and 794d, ambient exterior tangent 796c connecting ambient vertices 794e and 794f, and ambient exterior tangent 796d connecting ambient vertices 794g and 794h.

Ambient shadow polygon 798 is formed in scenario 700 by taking a convex hull of ambient vertices 794a-794h and eight additional interpolation points: two interpolation points taken to form a polygonal representation having three line segments representing of an arc of expansion circle 792a between ambient vertices 794a and 794h, two interpolation points taken to form a polygonal representation having three line segments representing an arc of expansion circle 792b between ambient vertices 794b and 794c, two interpolation points taken to form a polygonal representation having three line segments representing an arc of expansion circle 792c between ambient vertices 794d and 794e, and two interpolation points taken to form a polygonal representation having three line segments representing an arc of expansion circle 792d between ambient vertices 794f and 794g.

FIGS. 8A-8F show scenario 800 for rendering occluding polygon 810 as part of a GUI, such as GUI 830, in accordance with an example embodiment. GUI 830 can include hardware of a computing device and/or computer-readable instructions executed by one or more processors of the computing device, such as computing device 1200 discussed below in the context of FIG. 12A, that is configured to perform at least the functionality associated with scenario 800. In some embodiments, the computer-readable instructions can include instructions for a software application that generates GUI 830.

FIG. 8A shows example occluding polygon 810 as a white polygon representing a rounded rectangle having the word "Card" written in black at upper left, and shown in the figure on a grey checked background. Occluding polygon 810 can be an object used in and/or rendered by a GUI, such as a card, window, icon, dialog or other visible object suitable for use and/or display by the GUI. In other scenarios, one or more other occluding polygons can be used instead of occluding polygon 810.

FIG. 8B shows ambient shadow polygon tessellation 820 for occluding polygon 810, in accordance with an example embodiment. In scenario 800, ambient shadow polygon tessellation 820 is an ambient shadow polygon generated using the techniques of method 500 discussed above in the context of FIG. 5.

Figure 8C:
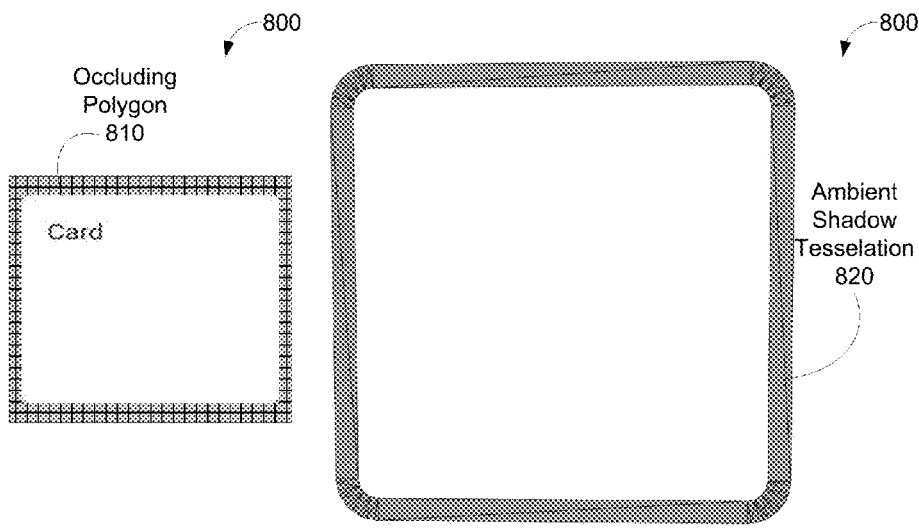
FIG. 8C shows a graphical user interface (GUI) with a display of an ambient shadow, in accordance with an example embodiment.
Figure 8C:
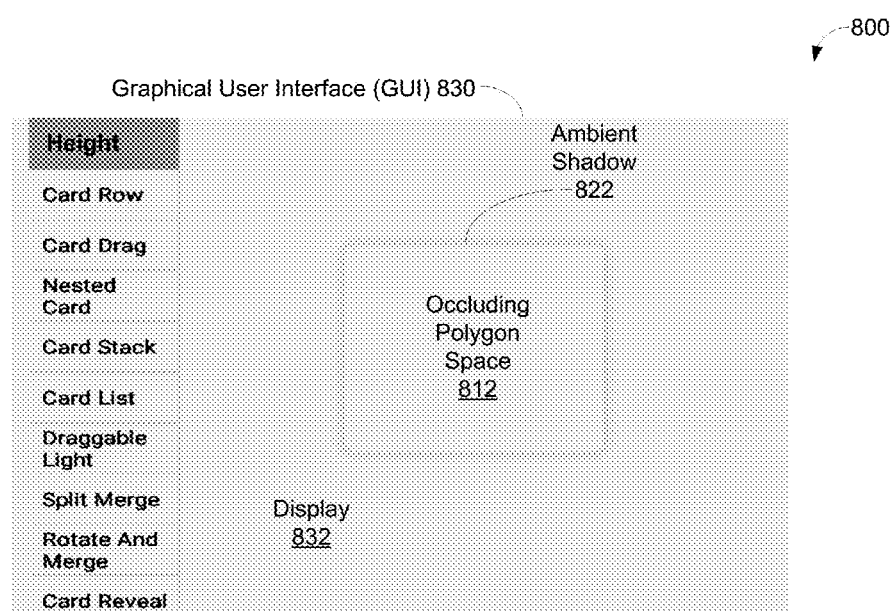

FIG. 8C shows a GUI 830 generating display 832 of ambient shadow 822 as part of scenario 800, in accordance with an example embodiment. Display 832 is generated by rendering ambient shadow tessellation 820 with occluding polygon space 812 to obtain ambient shadow 822. Once generated, GUI 830 can be configured to show display 832.

Figure 8D:
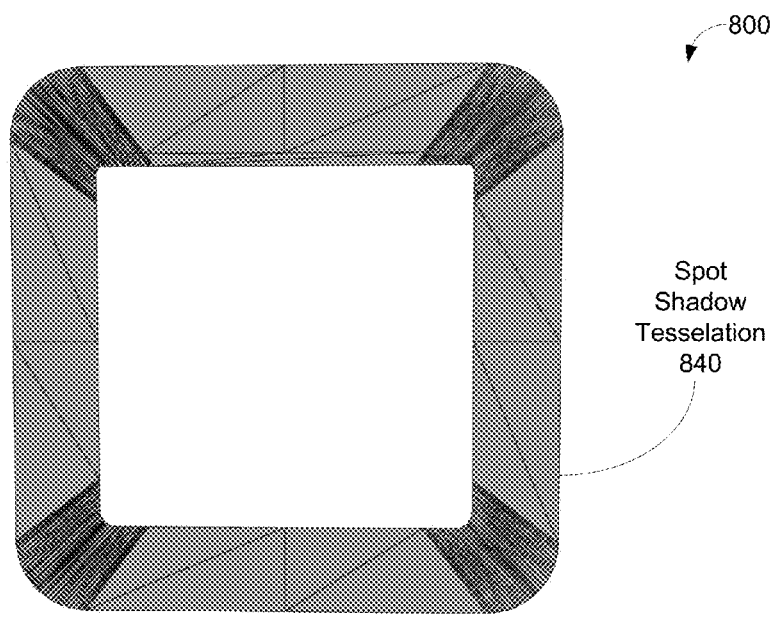
FIG. 8D shows a tessellation of a shadow of the occluding polygon of FIG. 8A, in accordance with an example embodiment.

FIG. 8D shows spot shadow tessellation 840 of occluding polygon 810, in accordance with an example embodiment. In scenario 800, spot shadow tessellation 840 is a tessellation of a spot shadow generated using the techniques of method 100 discussed above in the context of FIG. 1.

Figure 8E:
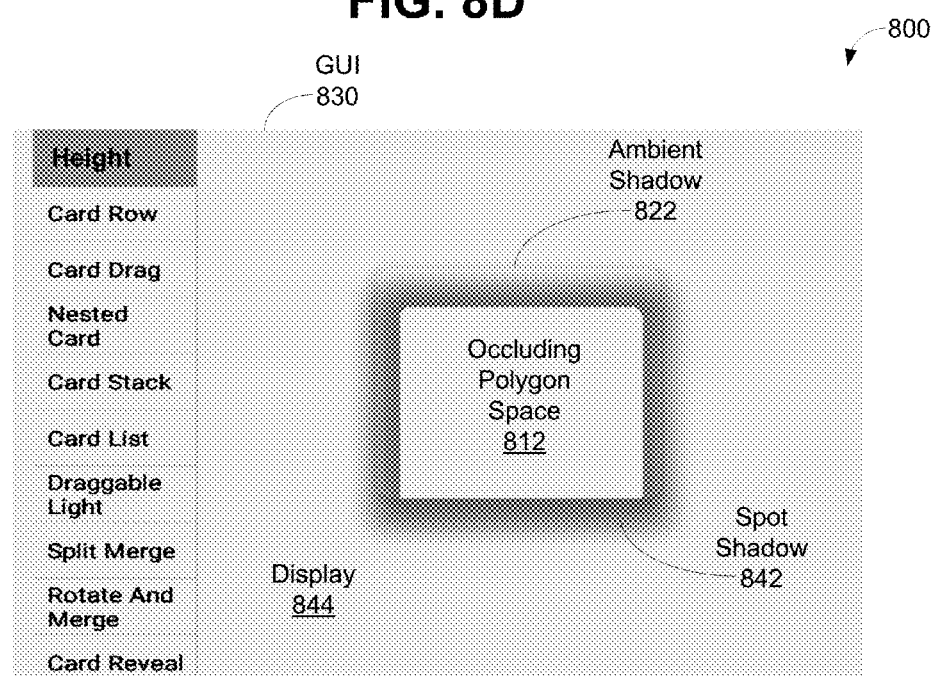
FIG. 8E shows a GUI with a display of an ambient shadow and a spot shadow, in accordance with an example embodiment.

FIG. 8E shows a GUI 830 generating display 844 of ambient shadow 822 and spot shadow 842 as part of scenario 800, in accordance with an example embodiment. Display 844 is generated by rendering ambient shadow tessellation 820 with occluding polygon space 812 to obtain ambient shadow 822 and rendering spot shadow tessellation 840 with occluding polygon space 812 to obtain spot shadow 842. Once generated, GUI 830 can be configured to show display 844.

Figure 8F:
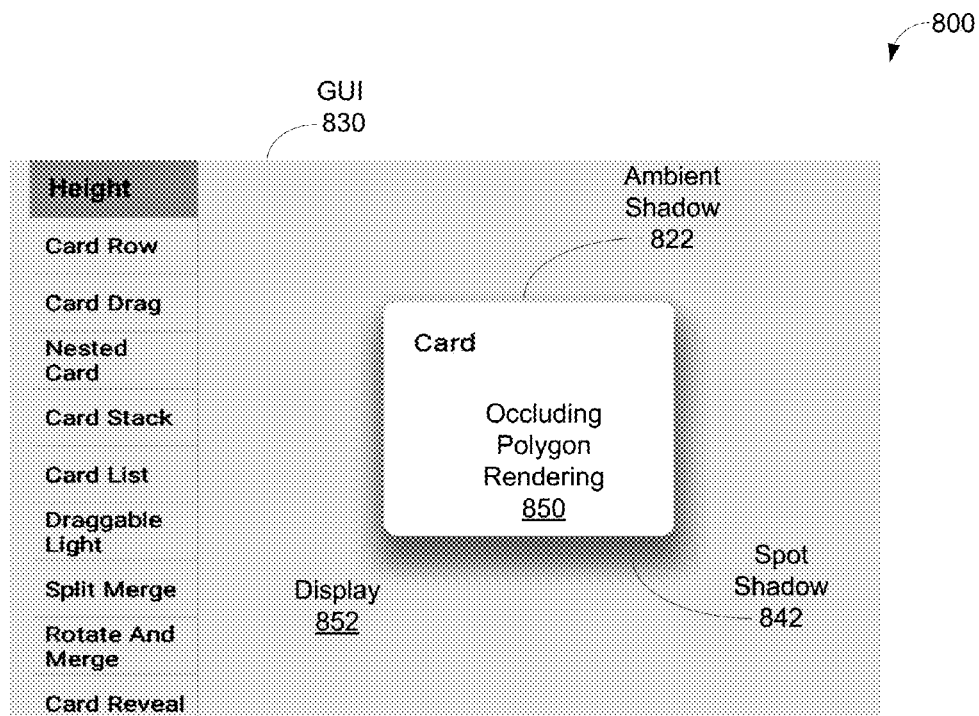
FIG. 8F shows a GUI with a display of the occluding polygon of FIG. 8A, an ambient shadow, and a spot shadow, in accordance with an example embodiment.

FIG. 8F shows display 852 of GUI 830, in accordance with an example embodiment. Scenario 800 continues by GUI 830 generating display 852 from display 844 by rendering occluding polygon 810 in occluding polygon space 812. In scenario 800, occluding polygon rendering 850 of occluding polygon 810 is larger in display 852 than occluding polygon 812, thereby leading to some overdraw of ambient shadow 822 and spot shadow 842 by occluding polygon rendering 850. However, by leaving occluding polygon space 812, overdraw by GUI 830 in generating display 852 is minimized. Once display 852 is generated, GUI 830 can be configured to show display 852 to replace display 844.

Figure 9:
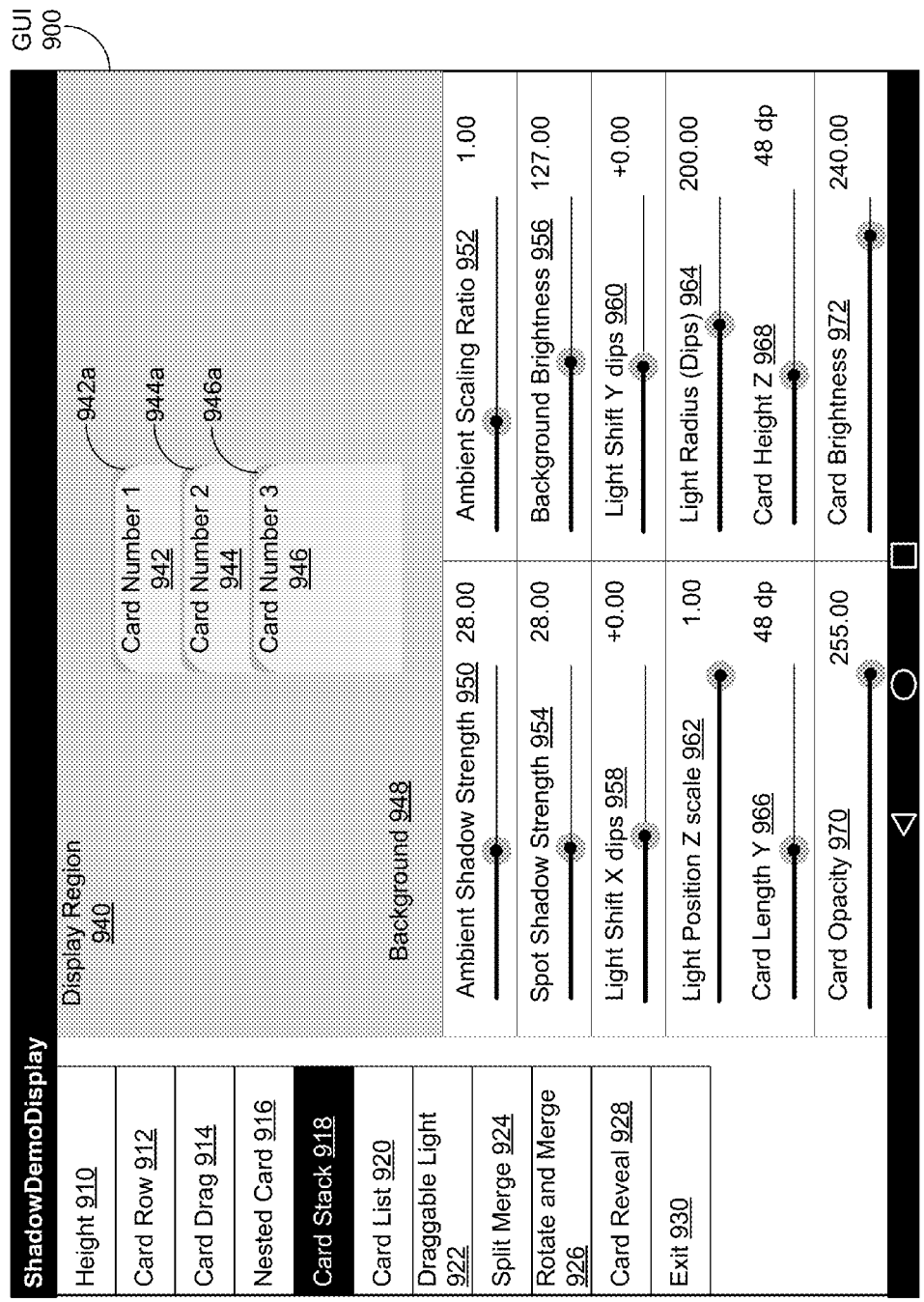
FIG. 9 depicts a GUI related to shadows, in accordance with an example embodiment.

FIG. 9 depicts GUI 900 related to shadows, in accordance with an example embodiment. GUI 900 can be provided using hardware of a computing device and/or computer-readable instructions executed by one or more processors of the computing device, such as computing device 1200 discussed below in the context of FIG. 12A. In some embodiments, the computer-readable instructions can include instructions for a software application that generates GUI 900.

GUI 900 includes control buttons 910, 912, 914, 916, 918, 920, 922, 924, 926, 928, and 930, display region 940, and parameter controls 950, 952, 954, 956, 958, 960, 962, 964, 966, 968, 970, and 972. Each of control buttons 910-930, when selected, indicates a type of shadow simulation to be displayed in display region 940. For example, card stack control button 918 is shown in FIG. 9 with a black color, while the other control buttons 910-916 and 920-930 are each shown with a white color, to indicate that card stack control button 918 has been selected. As card stack control button 918 has been selected, a group, or stack, of three cards 942, 944, and 946 are displayed in display region 940. Each card is display region 940 displayed with a corresponding shadow. FIG. 9 shows card 942 with shadow 942a cast upon background 948 of display region 940, card 944 with shadow 944a cast upon card 942 to indicate card 944 is atop card 942, and card 946 with shadow 946a cast upon card 944 to indicate card 946 is atop card 944. In some examples, objects displayed in display region 940, such as cards 942, 944, 946 can be modified; e.g., an object can be resized, recolored, deleted, inserted, etc. via controls (not shown in FIG. 9) available by selecting an object or background 948 and using a "right-click" menu or similar control.

Selections of control buttons can enable parameter controls, such as via selection of control button 910 to enable card height selection, select a card configuration, such as selections of control button 912 for a card row, control button 914 for a dragging card simulation, control button 916 for a nested card arrangement, control button 918 for a stack of cards, and control button 920 for a list of cards. Selection of control button 922 allows placement of a light source and selections of control buttons 924, 926, and 928 allow for various card animations, such as splitting and merging a group of cards by selection of control button 924, rotating and merging a group of cards by selection of control button 926, and revealing cards within a group of cards by selection of control button 928. Exit control button 930 can be used to close GUI 900 and perhaps terminate an application providing GUI 900.

Other control buttons can be provided, such as but not limited to, control buttons to enable selection and positioning of multiple light sources, controlling colors of light emitted by light sources, changing orientation of display region in 3-D space, specifying occluding polygons other than cards, changing triangulation techniques associated with shadows, and changing convex representations for the outer edge of the umbra/penumbra (e.g., a convex hull representation or a smoothed convex hull representation).

Parameter control 950 can control strength, or darkness, of shadows caused by occlusion of ambient light, such as discussed above regarding at least method 500 and FIGS. 5-6C. In the example of GUI 900, ambient shadow strength parameter control 950 can range from 0 for no ambient shadows to 255 for strongest ambient shadows. FIG. 9 shows ambient shadow strength parameter control 950 set to 28 for relatively light ambient shadows.

Parameter control 952 can control a ratio between strength of shadows cast by occlusion of ambient light and strength of shadows cast by occlusion of light from light sources, such as circular light sources. FIG. 9 shows ambient scaling ratio parameter control 952 set to 1.00 to indicate equal strength for shadows cast based on ambient light to shadows cast based on light from light sources. For GUI 900, ambient scaling ratio parameter control 952 can range from 0.2 to 4.2.

Parameter control 954 can control strength of shadows caused by occlusion of light emitted by light sources, such as discussed above regarding at least method 100 and FIGS. 1-4C. In the example of GUI 900, spot shadow strength parameter control 954 can range from 0 for no light source shadows to 255 for strongest light source shadows. FIG. 9 shows spot shadow strength parameter control 954 set to 28 for relatively light light source shadows.

Parameter control 956 can control a color of background 948 of display region 940. In the example of GUI 900, background brightness parameter control 956 can specify a grey scale value that ranges from 0 for a black background to 255 for a white background. FIG. 9 shows background brightness parameter control 956 set to 127 for a grey background. In other embodiments, additional parameter controls can be used to specify color value (e.g., an RGB triple) for coloring background 948.

Parameter controls 958 and 960 can control position of a center of a circular light source in respective X and Y dimensions. In the example of GUI 900, a light source is initially considered to be centered over display region 950. By changing light shift X parameter control 958, the center of a circular light source can be moved in the X dimension (horizontally) and by changing light shift Y parameter control 960, the center of a circular light source can be moved in the Y dimension (vertically). FIG. 9 shows both light shift X parameter control 958 and light shift Y parameter control 960 set to +0.00 to indicate no X or Y dimension movement of the light source.

Parameter control 962 can control a position of a center of a circular light source in a Z (depth) dimension. By increasing (decreasing) light position Z parameter control 962, the light source moves away from (closer to) display region 940 in the Z dimension. Generally, moving a light source closer to a display region makes resulting shadows smaller and more distinct/less diffuse, while moving a light source away from the display region makes resulting shadows larger and less distinct/more diffuse. FIG. 9 shows ambient light position Z parameter control 962 set to 1.00 indicating the light source is as close to display region 940 as GUI 900 will allow.

Parameter control 964 can control a size of a radius of a circular light source. Generally, larger light sources provide less distinct/more diffuse shadows than smaller light sources. FIG. 9 shows light radius parameter control 964 set to 200 for a moderate sized light source. In other embodiments, GUI 900 can provide more controls over geometry of light sources, such as, but not limited to, providing selections for light source shape (e.g., triangular, rectangular, pentagonal, hexagonal . . . ), light source vertices, and light source orientation/tilt with respect to background 948.

Parameter control 966 can control a size of a card, or other occluding object/occluding polygon, in a Y dimension (length). In the example of GUI 900, card length Y parameter control 966 can range from 20 for relatively short cards to 100 for relatively long cards. FIG. 9 shows card length Y parameter control 966 set to 48 for moderate sized cards. In other embodiments, an X dimension (width) control can be provided to control the width of a card.

Parameter control 968 can control a height (Z dimension amount) of a card over background 948. In the example of GUI 900, card height Z parameter control 968 can range from 0 for a card being placed directly on background 948 to 100 for a card being relatively high above background 948. Generally, as a card is lifted above a background, shadows of the card become larger and less distinct/more diffuse. FIG. 9 shows card height Z parameter control 968 set to 48 to indicate that a card is moderately high above background 948. In other embodiments, GUI 900 can provide more controls over geometry of cards, such as, but not limited to, providing selections for card shape (e.g., triangular, rectangular, pentagonal, hexagonal . . . ), vertices for an example card, and card orientation/tilt with respect to background 948.

Parameter control 970 can control opacity of a card. In the example of GUI 900, card opacity parameter control 970 can range from 0 a transparent card having no opacity to 255 for a fully opaque card having no transparency. FIG. 9 shows card opacity parameter control 970 set to 255 to indicate cards are fully opaque.

Parameter control 972 can control a color of a card in display region 940. In the example of GUI 900, card brightness parameter control 972 can specify a grey scale value that ranges from 0 for a black card to 255 for a white card. FIG. 9 shows card brightness parameter control 972 set to 240 for relatively light-colored cards. In some embodiments, additional parameter controls can be used to specify color value (e.g., an RGB triple) for coloring a card, and to specify different colors for different cards.

Additional parameters can be controlled as well, such as a parameter controlling whether a card (or cards) are fixed while a mobile device/receiver surface changes orientation or move with the receiver surface, a parameter controlling whether a light source (or light sources) are fixed while a mobile device/receiver surface changes orientation or move with the receiver surface. Many other parameters and corresponding controls are possible as well.

Figure 10:
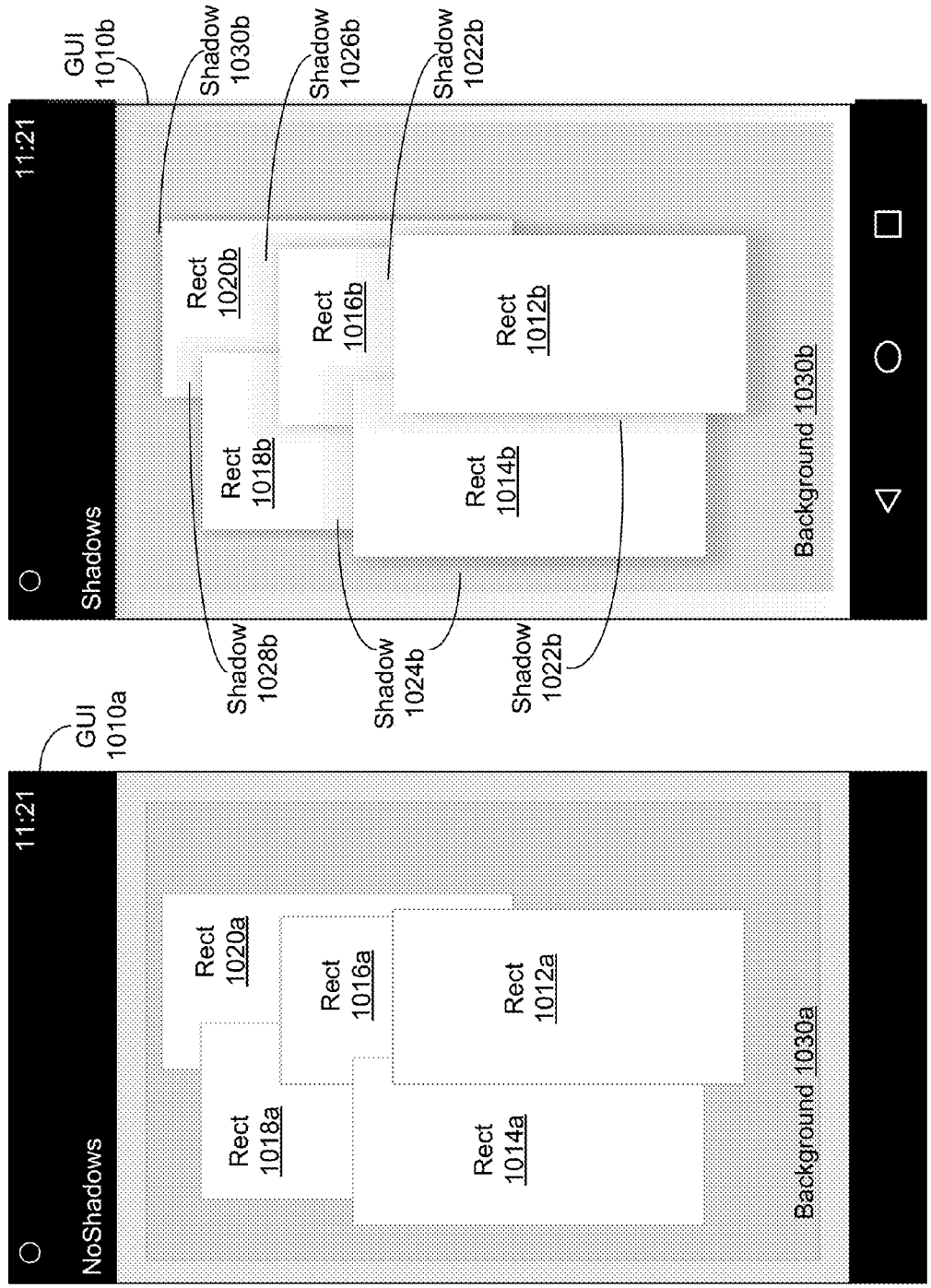
FIG. 10 depicts two GUIs, each displaying a pattern of overlapping rectangles, in accordance with an example embodiment.

FIG. 10 depicts two GUIs 1010a, 1010b each displaying a pattern of overlapping rectangles, in accordance with an example embodiment. Each of GUIs 1010a, 1010b can be provided using hardware of a computing device and/or computer-readable instructions executed by one or more processors of the computing device, such as computing device 1200 discussed below in the context of FIG. 12A. In some embodiments, the computer-readable instructions can include instructions for a software application that generates GUI 1010a and/or GUI 1010b.

GUI 1010a displays five rectangles 1012a, 1014a, 1016a, 1018a, 1020a on background 1030a. GUI 1010b also displays five rectangles 1012b, 1014b, 1016b, 1018b, 1020b on background 1030a, where a pattern of rectangles 1012a-1020a displayed by GUI 1010a is the same as a pattern of rectangles 1012b-1020b displayed by GUI 1010a. Each rectangle 1012a, 1014a, 1016a, 1018a, 1020a displayed by GUI 1010a has a corresponding respective rectangle 1012b, 1014b, 1016b, 1018b, 1020b displayed by GUI 1010b. As shown in FIG. 10, corresponding rectangles are displayed with the same size, color, and relative position by both GUIs 1010a and 1010b. For example, GUI 1010a displays rectangle 1012a as a white rectangle directly atop rectangles 1014a, 1016a, 1020a, and indirectly atop rectangle 1018a. Similarly, GUI 1010b displays rectangle 1012b as a white rectangle having the same size as rectangle 1012a and same position directly atop rectangles 1014b, 1016b, 1020b, and indirectly atop rectangle 1018b.

However, GUI 1010b also displays shadow 1022b for rectangle 1012b to provide an additional depth cue to a viewer of GUI 1010b that rectangle 1012b is atop the other rectangles. FIG. 10 shows that shadow 1022b uses background 1030b and rectangles 1014b, 1016b, and 1020b as receiver surfaces. Further, GUI 1010b also displays shadows 1024b, 1026b, 1028b, and 1030b for respective rectangle 1014b, 1016b, 1018b, and 1020b to provide additional depth cues to a viewer of GUI 1010b of the relative positions of rectangles displayed by GUI 1010b.

In some embodiments, one or more of rectangles 1012b, 1014b, 1016b, 1018b, 1020b can be a display generated by an operating system and/or an application running on a computing device providing GUI 1010b. Then, as a display rectangle is selected by a user of GUI 1010b, GUI 1010b can make the selected rectangle appear to be on top of the other rectangles and can draw a shadow for the selected rectangle atop the some or all of the other rectangles. For example, if rectangle 1016b were selected for display by the user, GUI 1010b can make rectangle 1016b appear to be atop rectangles 1012b, 1014b, 1018b, 1020b, and draw corresponding shadow 1026b atop rectangles 1012b, 1014b, 1018b, 1020b as well.

In another example, a pattern including other convex polygons, such as triangles, hexagons, pentagons, squares, and so on can be drawn by GUI 1010b with shadowed polygons similar to rectangle 1012b shadowed by shadow 1022b. In other examples, other applications than GUI 1010b can use the herein-described techniques to draw shadows of convex polygons from light emitted by polygonal light sources; e.g., a music application can draw a collection of polygonal images, such as images related to album or CD covers, to represent a collection of songs. The application can draw a top-most image of the collection of images to represent being a song currently being played. Then, the application can use the herein-described techniques to add shadows to the collection of images to add depth cues and aid a user of the application determine which image corresponds to the song currently being played. Many other examples of shadowed polygons drawn by a GUI, such as GUI 1010b, and/or applications are possible as well.

Example Data Network

Figure 11:
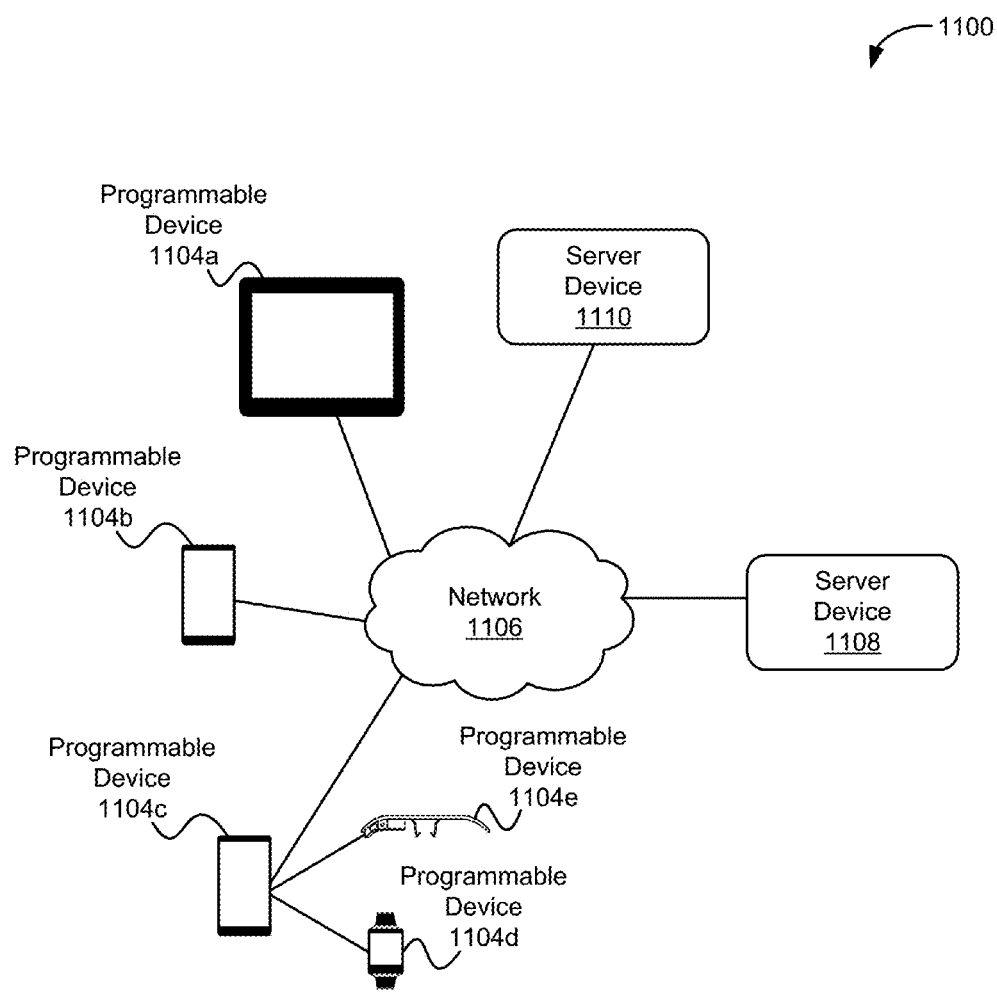
FIG. 11 depicts a distributed computing architecture, in accordance with an example embodiment.

FIG. 11 depicts a distributed computing architecture 1100 with server devices 1108, 1110 configured to communicate, via network 1106, with programmable devices 1104a, 1104b, 1104c, 1104d, and 1104e, in accordance with an example embodiment. Network 1106 may correspond to a LAN, a wide area network (WAN), a corporate intranet, the public Internet, or any other type of network configured to provide a communications path between networked computing devices. The network 1106 may also correspond to a combination of one or more LANs, WANs, corporate intranets, and/or the public Internet.

Although FIG. 11 only shows three programmable devices, distributed application architectures may serve tens, hundreds, or thousands of programmable devices. Moreover, programmable devices 1104a, 1104b, 1104c, 1104d, and 1104e (or any additional programmable devices) may be any sort of computing device, such as an ordinary laptop computer, desktop computer, wearable computing device, mobile computing device, head-mountable device (HMD), network terminal, wireless communication device (e.g., a smart phone or cell phone), and so on. In some embodiments, such as indicated with programmable devices 1104a, 1104b, and 1104c, programmable devices can be directly connected to network 1106. In other embodiments, such as indicated with programmable devices 1104d and 1104e, programmable devices can be indirectly connected to network 1106 via an associated computing device, such as programmable device 1104c. In this example, programmable device 1104c can act as associated computing device to pass electronic communications between programmable devices 1104d and 1104e and network 1106. In still other embodiments not shown in FIG. 11, a programmable device can be both directly and indirectly connected to network 1106.

Server devices 1108, 1110 can be configured to perform one or more services, as requested by programmable devices 1104a-1104e. For example, server device 1108 and/or 1110 can provide content to programmable devices 1104a-1104e. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, server device 1108 and/or 1110 can provide programmable devices 1104a-1104e with access to software for database, search, computation, graphical, audio, video, World Wide Web/Internet utilization, and/or other functions. Many other examples of server devices are possible as well.

Computing Device Architecture

Figure 12A:
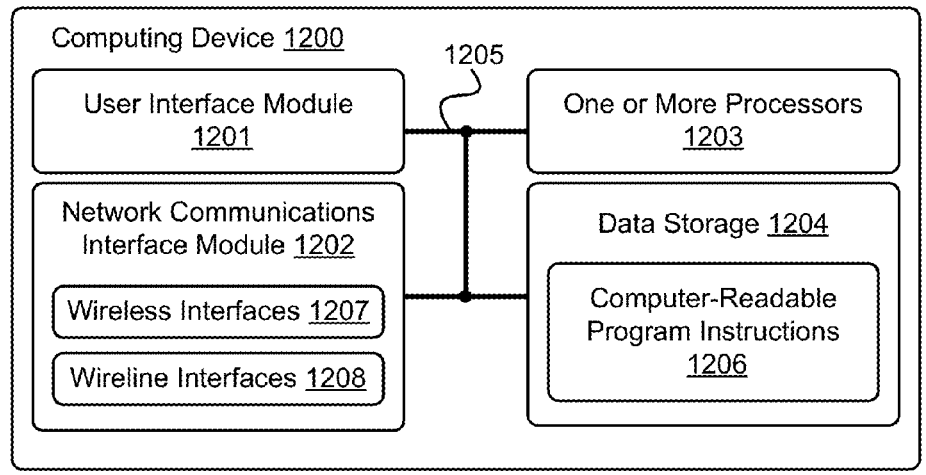
FIG. 12A is a block diagram of a computing device, in accordance with an example embodiment.

FIG. 12A is a block diagram of a computing device 1200 (e.g., system) in accordance with an example embodiment. In particular, computing device 1200 shown in FIG. 12A can be configured to perform one or more functions of GUIs 830, 900, 1010a, and 1010b, network 1106, server devices 1108, 1110, programmable devices 1104a, 1104b, 1104c, 1104d, and 1104e, method 100, method 500, and method 1300, and/or functionality related to one or more of scenarios 200, 300, 600, 700, and 800. Computing device 1200 may include a user interface module 1201, a network-communication interface module 1202, one or more processors 1203, and data storage 1204, all of which may be linked together via a system bus, network, or other connection mechanism 1205.

User interface module 1201 can be operable to send data to and/or receive data from exterior user input/output devices. For example, user interface module 1201 can be configured to send and/or receive data to and/or from user input devices such as a keyboard, a keypad, a touch screen, a computer mouse, a track ball, a joystick, a camera, a voice recognition module, and/or other similar devices. User interface module 1201 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, either now known or later developed. User interface module 1201 can also be configured to generate audible output(s), such as a speaker, speaker jack, audio output port, audio output device, earphones, and/or other similar devices.

Network-communications interface module 1202 can include one or more wireless interfaces 1207 and/or one or more wireline interfaces 1208 that are configurable to communicate via a network, such as network 1106 shown in FIG. 11. Wireless interfaces 1207 can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. Wireline interfaces 1208 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 1202 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

Processors 1203 can include one or more general purpose processors and/or one or more special purpose processors (e.g., digital signal processors, graphics processing units, application specific integrated circuits, etc.). Processors 1203 can be configured to execute computer-readable program instructions 1206 that are contained in the data storage 1204 and/or other instructions as described herein.

Data storage 1204 can include one or more computer-readable storage media that can be read and/or accessed by at least one of processors 1203. The one or more computer-readable storage media can include volatile and/or non-volatile storage components, such as optical, magnetic, organic or other memory or disc storage, which can be integrated in whole or in part with at least one of processors 1203. In some embodiments, data storage 1204 can be implemented using a single physical device (e.g., one optical, magnetic, organic or other memory or disc storage unit), while in other embodiments, data storage 1204 can be implemented using two or more physical devices.

Data storage 1204 can include computer-readable program instructions 1206 and perhaps additional data, such as but not limited to data used by one or more modules and/or other components of software update build server 100 and/or software update distribution server 160. In some embodiments, data storage 1204 can additionally include storage required to perform at least part of the methods and techniques and/or at least part of the functionality of the devices and networks; e.g., one or more images, such as one or more target images and/or one or more binary images, source file(s), source map(s), target file(s), target map(s), transfer(s), transfer list(s), auxiliary data, graph(s), and/or update package(s).

In some embodiments, computing device 1200 can include one or more sensors. The sensor(s) can be configured to measure conditions in an environment for computing device 1200 and provide data about that environment. The data can include, but is not limited to, location data about computing device 1200, velocity (speed, direction) data about computing device 1200, acceleration data about computing device, and other data about the environment for computing device 1200. The sensor(s) can include, but are not limited to, GPS sensor(s), location sensors(s), gyroscope(s), accelerometer(s), magnetometer(s), camera(s), light sensor(s), infrared sensor(s), and microphone(s). Other examples of sensors are possible as well.

Cloud-Based Servers

Figure 12B:
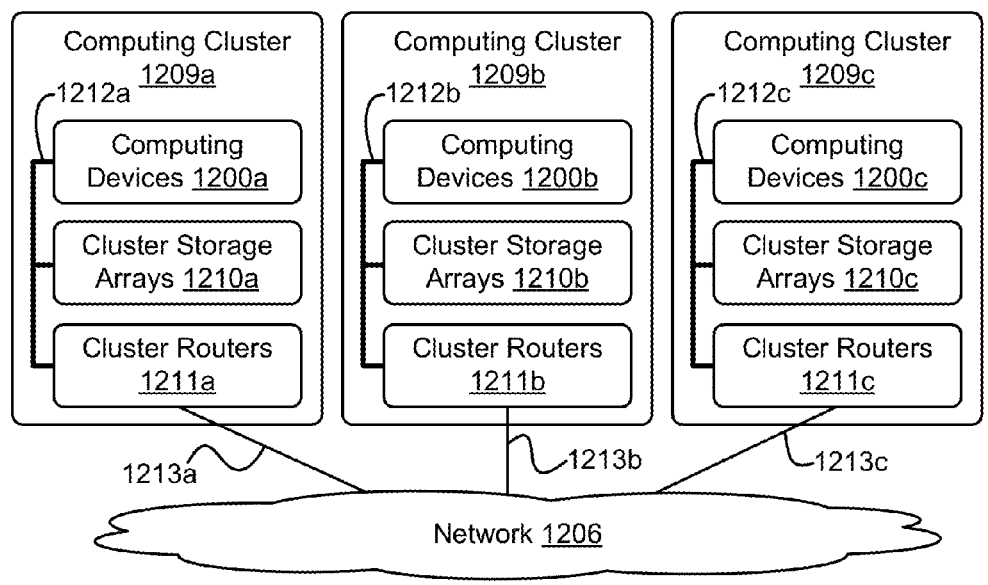
FIG. 12B depicts a cloud-based server system, in accordance with an example embodiment.

FIG. 12B depicts network 1106 of computing clusters 1209a, 1209b, 1209c arranged as a cloud-based server system in accordance with an example embodiment. Server devices 1108 and/or 1110 can be configured to perform some or all of the herein-described functions of GUIs 830, 900, 1010a, and 1010b, method 100, method 500, and method 1300, and/or some or all of the herein-described functionality related to one or more of scenarios 200, 300, 600, 700, and 800.

Some or all of the modules/components of server devices 1108 and/or 1110 can be cloud-based devices that store program logic and/or data of cloud-based applications and/or services. In some embodiments, server devices 1108 and/or 1110 can be on a single computing device residing in a single computing center. In other embodiments, server devices 1108 and/or 1110 can include multiple computing devices in a single computing center, or even multiple computing devices located in multiple computing centers located in diverse geographic locations. For example, FIG. 11 depicts each of server devices 1108 and 1110 residing in different physical locations.

In some embodiments, software and data associated with server devices 1108 and/or 1110 can be encoded as computer readable information stored in non-transitory, tangible computer readable media (or computer readable storage media) and accessible by one or more of programmable devices 1104a-1104e and/or other computing devices. In some embodiments, data associated with server devices 1108 and/or 1110 can be stored on a single disk drive or other tangible storage media, or can be implemented on multiple disk drives or other tangible storage media located at one or more diverse geographic locations.

FIG. 12B depicts a cloud-based server system in accordance with an example embodiment. In FIG. 12B, the functions of server devices 1108 and/or 1110 can be distributed among three computing clusters 1209a, 1209b, and 1208c. Computing cluster 1209a can include one or more computing devices 1200a, cluster storage arrays 1210a, and cluster routers 1211a connected by a local cluster network 1212a. Similarly, computing cluster 1209b can include one or more computing devices 1200b, cluster storage arrays 1210b, and cluster routers 1211b connected by a local cluster network 1212b. Likewise, computing cluster 1209c can include one or more computing devices 1200c, cluster storage arrays 1210c, and cluster routers 1211c connected by a local cluster network 1212c.

In some embodiments, each of the computing clusters 1209a, 1209b, and 1209c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 1209a, for example, computing devices 1200a can be configured to perform various computing tasks of server devices 1108 and/or 1110. In one embodiment, the various functionalities of server devices 1108 and/or 1110 can be distributed among one or more of computing devices 1200a, 1200b, and 1200c. Computing devices 1200b and 1200c in computing clusters 1209b and 1209c can be configured similarly to computing devices 1200a in computing cluster 1209a. On the other hand, in some embodiments, computing devices 1200a, 1200b, and 1200c can be configured to perform different functions.

In some embodiments, computing tasks and stored data associated with server devices 1108 and/or 1110 be distributed across computing devices 1200a, 1200b, and 1200c based at least in part on the storage and/or processing requirements of some or all components/modules of server devices 1108 and/or 1110, the storage and/or processing capabilities of computing devices 1200a, 1200b, and 1200c, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 1210a, 1210b, and 1210c of the computing clusters 1209a, 1209b, and 1209c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of server devices 1108 and/or 1110 can be distributed across computing devices 1200a, 1200b, and 1200c of computing clusters 1209a, 1209b, and 1209c, various active portions and/or backup portions of data for these components can be distributed across cluster storage arrays 1210a, 1210b, and 1210c. For example, some cluster storage arrays can be configured to store the data of one or more modules/components of server devices 1108 and/or 1110, while other cluster storage arrays can store data of other modules/components of server devices 1108 and/or 1110. Additionally, some cluster storage arrays can be configured to store backup versions of data stored in other cluster storage arrays.

The cluster routers 1211a, 1211b, and 1211c in computing clusters 1209a, 1209b, and 1209c can include networking equipment configured to provide internal and external communications for the computing clusters. For example, the cluster routers 1211a in computing cluster 1209a can include one or more internet switching and routing devices configured to provide (i) local area network communications between the computing devices 1200a and the cluster storage arrays 1201a via the local cluster network 1212a, and (ii) wide area network communications between the computing cluster 1209a and the computing clusters 1209b and 1209c via the wide area network connection 1213a to network 1106. Cluster routers 1211b and 1211c can include network equipment similar to the cluster routers 1211a, and cluster routers 1211b and 1211c can perform similar networking functions for computing clusters 1209b and 1209b that cluster routers 1211a perform for computing cluster 1209a.

In some embodiments, the configuration of the cluster routers 1211a, 1211b, and 1211c can be based at least in part on the data communication requirements of the computing devices and cluster storage arrays, the data communications capabilities of the network equipment in the cluster routers 1211a, 1211b, and 1211c, the latency and throughput of local networks 1212a, 1212b, 1212c, the latency, throughput, and cost of wide area network links 1213a, 1213b, and 1213c, and/or other factors that can contribute to the cost, speed, fault-tolerance, resiliency, efficiency and/or other design goals of the moderation system architecture.

Example Methods of Operation

Figure 13:
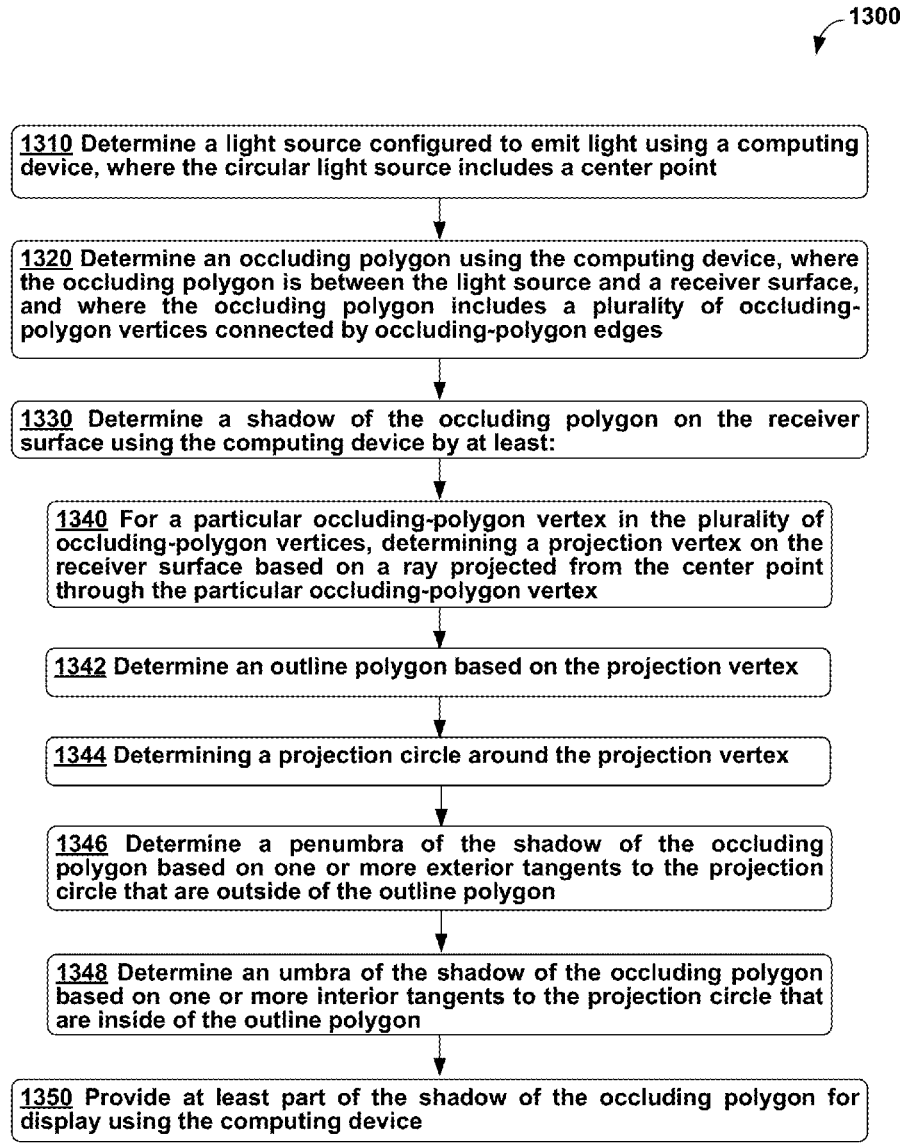
FIG. 13 is a flow chart illustrating a method, in accordance with an example embodiment.

FIG. 13 is a flow chart illustrating method 1300, in accordance with an embodiment. Method 1300 can be carried out by one or more computing devices, such as, but not limited to, programmable device 1104a, programmable device 1104b, programmable device 1104c, network 1106, server device 1108, computing device 1200, computing cluster 1209a, computing cluster 1209b, and/or computing cluster 1209c.

Method 1300 can be begin at block 1310, where a computing device can determine a light source configured to emit light, where the light source includes a center point, such as discussed above in the context of at least FIGS. 1, 2A, 3A, and 7A.

At block 1320, the computing device can determine an occluding polygon, such as discussed above in the context of at least FIGS. 1, 2A, 3A, and 7A. The occluding polygon can be between the light source and a receiver surface. The occluding polygon can include a plurality of occluding-polygon vertices connected by occluding-polygon edges. In some embodiments, the occluding polygon can be based upon a rectangle.

At block 1330, the computing device can determine a shadow of the occluding polygon on the receiver surface using the computing device by at least carrying out the procedures of blocks 1340, 1342, 1344, 1346, and 1348.

At block 1340, for a particular occluding-polygon vertex in the plurality of occluding-polygon vertices, the computing device can determine a projection vertex on the receiver surface based on a ray projected from the center point through the particular occluding-polygon vertex, such as discussed above in the context of at least FIGS. 1, 2A, 2B, 2C, 2D, 3A, 3B, 4A, 7A, and 7C.

At block 1342, the computing device can determine an outline polygon based on the projection vertex, such as discussed above in the context of at least FIGS. 1, 2A, 2B, 3A, 3B, 7A, 7C, and 7D. In some embodiments, the outline polygon can include a plurality of projection vertices connected by outline-polygon edges, where the plurality of projection vertices includes the projection vertex, such as discussed above in the context of at least FIGS. 1, 2A, 2B, 3A, 3B, 7A, 7C, and 7D.

At block 1344, the computing device can determine a projection circle around the projection vertex, such as discussed above in the context of at least FIGS. 1, 2A, 2B, 3A, 3B, 7A, 7C, and 7D. In some embodiments, determining the projection circle around the projection vertex can include determining a radius for the projection circle based on a height of a corresponding occluding-polygon vertex above the receiver surface, such as discussed above in the context of at least FIGS. 1, 2B, 3B, 7A, 7B, 7C, and 7D.

At block 1346, the computing device can determine a penumbra of the shadow of the occluding polygon based on one or more exterior tangents to the projection circle that are outside of the outline polygon, such as discussed above in the context of at least FIGS. 1, 2C, 2D, 2E, 4A, 4B, 4C, and 7D.

In some embodiments, determining the penumbra can include: determining a particular outline-polygon edge of the outline-polygon edges, where the particular outline-polygon edge connects a first projection vertex to a second projection vertex, where the first projection vertex is associated with a first projection circle, and where the second projection vertex is associated with a second projection circle; determining a normal to the particular outline-polygon edge; determining a first intersection of a first ray with the first projection circle, where the first ray starts at the first projection vertex and is directed along the normal to the particular outline-polygon edge, and where the first intersection is outside of the outline polygon; determining a second intersection of a second ray with the second projection circle, where the second ray starts at the second projection vertex and is directed along the normal to the particular outline-polygon edge, and where the second intersection is outside of the outline polygon; and determining a particular exterior tangent that includes a line segment between the first intersection and the second intersection, where the penumbra includes the particular exterior tangent, such as discussed above in the context of at least FIGS. 1, 2C, 4B, and 7D.

At block 1348, the computing device can determine an umbra of the shadow of the occluding polygon based on one or more interior tangents to the projection circle that are inside of the outline polygon, such as discussed above in the context of at least FIGS. 1, 2C, 2D, 2E, 4A, 4B, 4C, and 7D.

In some embodiments, determining the umbra can include: determining a particular outline-polygon edge of the outline-polygon edges, where the particular outline-polygon edge connects a first projection vertex to a second projection vertex, where the first projection vertex is associated with a first projection circle, and where the second projection vertex is associated with a second projection circle; determining a centroid of the outline polygon; determining a first intersection of a first ray with the first projection circle, where the first ray starts at the centroid of the outline polygon and is directed through the first projection vertex, and where the first intersection is inside of the outline polygon; determining a second intersection of a second ray with the second projection circle, where the second ray starts at the centroid of the outline polygon and is directed through the second projection vertex, and where the second intersection is inside of the outline polygon; and determining a particular interior tangent that includes a line segment between the first intersection and the second intersection, where the umbra includes the particular interior tangent, such as discussed above in the context of at least FIGS. 1, 2C, 4B, and 7D.

At block 1350, the computing device can provide at least part of the shadow of the occluding polygon for display, such as discussed above in the context of at least FIGS. 1, 2E, 8C, 8E, 8F, and 10. In some embodiments, providing the at least part of the shadow of the occluding polygon for display includes providing at least part of the umbra and/or at least part of the penumbra for display, such as discussed above in the context of at least FIGS. 1, 2E, 8E, 8F, and 10.

In other embodiments, providing the at least part of the shadow of the occluding polygon for display can include providing at least part of the occluding polygon and the at least part of the shadow for display, such as discussed above in the context of at least FIGS. 1, 2E, 8F, and 10. In other embodiments, the occluding polygon can be a user-interface element of a GUI. Then, providing the at least part of the shadow of the occluding polygon for display includes providing a display of the GUI that includes at least part of the occluding polygon and the at least part of the shadow, such as discussed above in the context of at least FIGS. 8F, and 10.

In some embodiments, method 1300 additionally can include: determining a projection matrix, where the projection matrix is configured to determine a projection of at least a portion of a three-dimensional viewing volume onto the receiver surface, and where the viewing volume includes the light source and the occluding polygon; determining an ambient-outline polygon by projecting the occluding polygon onto the receiver surface using the projection matrix, where the ambient-outline polygon includes a plurality of ambient-outline vertices, and where each of the ambient-outline vertices corresponds to an occluding-polygon vertex; for each ambient-outline vertex, determining a ambient-outline circle around the ambient-outline vertex; and determining an ambient shadow of the occluding polygon based on exterior tangents to the ambient-outline circles that are outside of the ambient-outline polygon, such as discussed above in the context of at least FIGS. 5, 6A, 6B, 6C, and 7E. In particular embodiments, providing the at least part of the shadow of the occluding polygon for display includes providing at least part of the ambient shadow for display, such as discussed above in the context of at least FIGS. 5, 6C, 7E, 8C, and 8E.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

The invention claimed is:

1. A method, comprising:
    determining a light source configured to emit light using a computing device, wherein the light source comprises a center point;
    determining an occluding polygon using the computing device, wherein the occluding polygon is between the light source and a receiver surface, and wherein the occluding polygon comprises a plurality of occluding-polygon vertices connected by occluding-polygon edges;
    determining a shadow of the occluding polygon on the receiver surface using the computing device by at least:
        for a particular occluding-polygon vertex in the plurality of occluding-polygon vertices, determining a projection vertex on the receiver surface based on a ray projected from the center point through the particular occluding-polygon vertex;
        determining a projection circle around the projection vertex;
        determining a penumbra of the shadow of the occluding polygon based on one or more tangents to the projection circle; and
        determining an umbra of the shadow of the occluding polygon based on one or more additional tangents to the projection circle; and
    providing at least a part of the shadow of the occluding polygon for display using the computing device.

2. The method of claim 1, wherein determining the projection circle around the projection vertex comprises determining a radius for the projection circle based on a height of a corresponding occluding-polygon vertex above the receiver surface.

3. The method of claim 1, further comprising:
    determining an outline polygon comprising a plurality of projection vertices connected by outline-polygon edges, wherein the plurality of projection vertices comprises the projection vertex.

4. The method of claim 3, wherein determining the penumbra comprises:
    determining a particular outline-polygon edge of the outline-polygon edges, wherein the particular outline-polygon edge connects a first projection vertex to a second projection vertex, wherein the first projection vertex is associated with a first projection circle, and wherein the second projection vertex is associated with a second projection circle;
    determining a normal to the particular outline-polygon edge;
    determining a first intersection of a first ray with the first projection circle, wherein the first ray starts at the first projection vertex and is directed along the normal to the particular outline-polygon edge, and wherein the first intersection is outside of the outline polygon;
    determining a second intersection of a second ray with the second projection circle, wherein the second ray starts at the second projection vertex and is directed along the normal to the particular outline-polygon edge, and wherein the second intersection is outside of the outline polygon; and
    determining a particular exterior tangent that comprises a line segment between the first intersection and the second intersection, wherein the penumbra comprises the particular exterior tangent.

5. The method of claim 3, wherein determining the umbra comprises:
    determining a particular outline-polygon edge of the outline-polygon edges, wherein the particular outline-polygon edge connects a first projection vertex to a second projection vertex, wherein the first projection vertex is associated with a first projection circle, and wherein the second projection vertex is associated with a second projection circle;
    determining a centroid of the outline polygon;
    determining a first intersection of a first ray with the first projection circle, wherein the first ray starts at the centroid of the outline polygon and is directed through the first projection vertex, and wherein the first intersection is inside of the outline polygon;
    determining a second intersection of a second ray with the second projection circle, wherein the second ray starts at the centroid of the outline polygon and is directed through the second projection vertex, and wherein the second intersection is inside of the outline polygon; and
determining a particular interior tangent that comprises a line segment between the first intersection and the second intersection, wherein the umbra comprises the particular interior tangent.

6. The method of claim 1, further comprising:
determining a projection matrix, wherein the projection matrix is configured to determine a projection of at least a portion of a three-dimensional viewing volume onto the receiver surface, and wherein the viewing volume includes the light source and the occluding polygon;
determining an ambient-outline polygon by projecting the occluding polygon onto the receiver surface using the projection matrix, wherein the ambient-outline polygon comprises a plurality of ambient-outline vertices, and wherein each of the ambient-outline vertices corresponds to an occluding-polygon vertex;
for each ambient-outline vertex, determining an ambient-outline circle around the ambient-outline vertex; and
determining an ambient shadow of the occluding polygon based on exterior tangents to the ambient-outline circles that are outside of the ambient-outline polygon.

7. The method of claim 6, wherein providing the at least the part of the shadow of the occluding polygon for display comprises providing at least a part of the ambient shadow for display.

8. The method of claim 1, wherein providing the at least the part of the shadow of the occluding polygon for display comprises providing at least a part of the umbra and/or at least a part of the penumbra for display.

9. The method of claim 1, wherein providing the at least the part of the shadow of the occluding polygon for display comprises providing at least a part of the occluding polygon and the at least the part of the shadow for display.

10. The method of claim 1, wherein the occluding polygon is a user-interface element of a graphical user interface (GUI), and wherein providing the at least the part of the shadow of the occluding polygon for display comprises providing a display of the GUI that includes at least a part of the occluding polygon and the at least the part of the shadow.

11. A computing device, comprising:
one or more processors; and
data storage configured to store at least executable instructions, wherein the executable instructions, when executed by the one or more processors, cause the computing device to perform functions comprising:
determining a light source configured to emit light, wherein the light source comprises a center point;
determining an occluding polygon between the light source and a receiver surface, wherein the occluding polygon comprises a plurality of occluding-polygon vertices connected by occluding-polygon edges;
determining a shadow of the occluding polygon on the receiver surface by at least:
for a particular occluding-polygon vertex in the plurality of occluding-polygon vertices, determining a projection vertex on the receiver surface based on a ray projected from the center point through the particular occluding-polygon vertex;
determining a projection circle around the projection vertex;
determining a penumbra of the shadow of the occluding polygon based on one or more tangents to the projection circle; and
determining an umbra of the shadow of the occluding polygon based on one or more additional tangents to the projection circle; and
providing at least a part of the shadow of the occluding polygon for display.

12. The computing device of claim 11, wherein determining the projection circle around the projection vertex comprises determining a radius for the projection circle based on a height of a corresponding occluding-polygon vertex above the receiver surface.

13. The computing device of claim 11, wherein the functions further comprise:
determining an outline polygon comprising a plurality of projection vertices connected by outline-polygon edges, wherein the plurality of projection vertices comprises the projection vertex.

14. The computing device of claim 13, wherein determining the penumbra comprises:
determining a particular outline-polygon edge of the outline-polygon edges, wherein the particular outline-polygon edge connects a first projection vertex to a second projection vertex, wherein the first projection vertex is associated with a first projection circle, and wherein the second projection vertex is associated with a second projection circle;
determining a normal to the particular outline-polygon edge;
determining a first intersection of a first ray with the first projection circle, wherein the first ray starts at the first projection vertex and is directed along the normal to the particular outline-polygon edge, and wherein the first intersection is outside of the outline polygon;
determining a second intersection of a second ray with the second projection circle, wherein the second ray starts at the second projection vertex and is directed along the normal to the particular outline-polygon edge, and wherein the second intersection is outside of the outline polygon; and
determining a particular exterior tangent of the exterior tangents that comprises a line segment between the first intersection and the second intersection, wherein the penumbra comprises the particular exterior tangent.

15. The computing device of claim 13, wherein determining the umbra comprises:
determining a particular outline-polygon edge of the outline-polygon edges, wherein the particular outline-polygon edge connects a first projection vertex to a second projection vertex, wherein the first projection vertex is associated with a first projection circle, and wherein the second projection vertex is associated with a second projection circle;
determining a centroid of the outline polygon;
determining a first intersection of a first ray with the first projection circle, wherein the first ray starts at the centroid of the outline polygon and is directed through the first projection vertex, and wherein the first intersection is inside of the outline polygon;
determining a second intersection of a second ray with the second projection circle, wherein the second ray starts at the centroid of the outline polygon and is directed through the second projection vertex, and wherein the second intersection is inside of the outline polygon; and
determining a particular interior tangent that comprises a line segment between the first intersection and the second intersection, wherein the umbra comprises the particular interior tangent.

16. The computing device of claim 11, wherein the functions further comprise:
   determining a projection matrix, wherein the projection matrix is configured to determine a projection of at least a portion of a three-dimensional viewing volume onto the receiver surface, and wherein the viewing volume includes the light source and the occluding polygon;
   determining an ambient-outline polygon by projecting the occluding polygon onto the receiver surface using the projection matrix, wherein the ambient-outline polygon comprises a plurality of ambient-outline vertices, and wherein each of the ambient-outline vertices corresponds to an occluding-polygon vertex;
   for each ambient-outline vertex, determining an ambient-outline circle around the ambient-outline vertex; and
   determining an ambient shadow of the occluding polygon based on exterior tangents to the ambient-outline circles that are outside of the ambient-outline polygon.

17. The computing device of claim 16, wherein providing the at least the part of the shadow of the occluding polygon for display comprises providing at least a part of the ambient shadow for display.

18. The computing device of claim 11, wherein providing the at least the part of the shadow of the occluding polygon for display comprises providing at least a part of the umbra and/or at least a part of the penumbra for display.

19. The computing device of claim 11, wherein the occluding polygon is a user-interface element of a graphical user interface (GUI), and wherein providing the display of at least the part of the shadow comprises providing a display of the GUI that includes at least a part of the occluding polygon and the at least the part of the shadow.

20. An article of manufacture including a tangible computer-readable storage medium having instructions stored thereon that, in response to execution by one or more processors of a computing device, cause the computing device to perform functions comprising:
   determining a light source configured to emit light, wherein the light source comprises a center point;
   determining an occluding polygon between the light source and a receiver surface, wherein the occluding polygon comprises a plurality of occluding-polygon vertices connected by occluding-polygon edges;
   determining a shadow of the occluding polygon on the receiver surface by at least:
      for each occluding-polygon vertex in the plurality of occluding-polygon vertices, determining a projection vertex on the receiver surface based on a ray projected from the center point through the occluding-polygon vertex;
      determining a projection circle around the projection vertex;
      determining a penumbra of the shadow of the occluding polygon based on one or more tangents to the projection circle; and
      determining an umbra of the shadow of the occluding polygon based on one or more additional tangents to the projection circle; and
   providing at least a part of the shadow of the occluding polygon for display.

* * * * *